US011873049B2

(12) United States Patent
Kurohori et al.

(10) Patent No.: US 11,873,049 B2
(45) Date of Patent: Jan. 16, 2024

(54) AIRBAG DEVICE FOR SADDLED VEHICLE

(71) Applicant: HONDA MOTOR CO., LTD., Tokyo (JP)

(72) Inventors: Seiichi Kurohori, Tokyo (JP); Takashi Sato, Tokyo (JP); Yutaka Aikyo, Tokyo (JP); Makoto Fuma, Yokohama (JP); Masaru Habu, Yokohama (JP); Sho Murakami, Yokohama (JP)

(73) Assignee: HONDA MOTOR CO., LTD., Tokyo (JP)

(*) Notice: Subject to any disclaimer, the term of this patent is extended or adjusted under 35 U.S.C. 154(b) by 11 days.

(21) Appl. No.: 17/763,415

(22) PCT Filed: Sep. 30, 2019

(86) PCT No.: PCT/JP2019/038644
§ 371 (c)(1),
(2) Date: Mar. 24, 2022

(87) PCT Pub. No.: WO2021/064835
PCT Pub. Date: Apr. 8, 2021

(65) Prior Publication Data
US 2022/0355882 A1 Nov. 10, 2022

(51) Int. Cl.
*B62J 27/20* (2020.01)
*B60R 21/20* (2011.01)

(52) U.S. Cl.
CPC ............ *B62J 27/20* (2020.02); *B60R 21/20* (2013.01)

(58) Field of Classification Search
CPC ................................ B62J 27/20; B60R 21/20
See application file for complete search history.

(56) References Cited

U.S. PATENT DOCUMENTS 11,613,323 B2 * 3/2023 Kurohori ............... B62K 19/40
280/730.1
2004/0026904 A1 2/2004 Yamazaki et al.
(Continued)

FOREIGN PATENT DOCUMENTS

CN 1454814 A 11/2003
CN 1927639 A 3/2007
(Continued)

OTHER PUBLICATIONS

Aikyo et al., Air Bag Device for Saddle-Type Vehicles, Feb. 28, 2019, EPO, WO 2019/038986 A1, Machine Translation of Description (Year: 2019).*

(Continued)

*Primary Examiner* — James A English
(74) *Attorney, Agent, or Firm* — Rankin, Hill & Clark LLP

(57) ABSTRACT

To enable a retainer to be easily manufactured in accordance with a position where an inflator is disposed. In an airbag device for a saddled vehicle including: a retainer provided behind a head pipe; an inflator; and an airbag accommodated in the retainer, the airbag being configured to be expanded by gas released by the inflator and deployed in front of a passenger, the retainer has a box shape formed by assembling a plurality of components, the inflator is disposed to be offset outward in a vehicle width direction relative to the head pipe, the first component covers the inflator from a vehicle front side, a second component is provided behind the head pipe, and a third component is provided on a side of the passenger and is fitted to the second component and the first component from a back side.

8 Claims, 21 Drawing Sheets

(56) References Cited

U.S. PATENT DOCUMENTS

| | | | | |
|---|---|---|---|---|
| 2004/0207182 | A1* | 10/2004 | Miyata | B62J 27/20 180/219 |
| 2004/0251664 | A1* | 12/2004 | Miyata | B60R 21/201 280/730.1 |
| 2007/0051551 | A1 | 3/2007 | Kobayashi | |
| 2009/0218791 | A1* | 9/2009 | Iijima | B62J 27/20 280/728.2 |
| 2021/0170976 | A1* | 6/2021 | Miyakawa | B60R 21/16 |
| 2021/0237821 | A1* | 8/2021 | Villeius | B62J 27/20 |

FOREIGN PATENT DOCUMENTS

| | | |
|---|---|---|
| CN | 104816774 A | 8/2015 |
| JP | 2001-219884 A | 8/2001 |
| JP | 2003-237662 A | 8/2003 |
| JP | 2011-000993 | 1/2011 |
| JP | 2011-000996 | 1/2011 |
| JP | 2015-145151 | 8/2015 |
| JP | 2018-052285 A | 4/2018 |
| WO | 2019/038986 | 2/2019 |

OTHER PUBLICATIONS

International Preliminary Report on Patentability dated Mar. 31, 2022, 4 pages.
Indian Office Action dated Jul. 27, 2022 issued in corresponding Application No. 202217021505; English translation Included (6 pages).
Extended European search report dated Aug. 26, 2022; Application No. 19 947 425.5 (9 pages).
International Search Report, dated Dec. 10, 2019, 1 page.
International Preliminary Report on Patentability (IPEA/409), 8 pages.
Chinese Office Action dated Mar. 4, 2023, 7 pages.
Indonesian Office Action dated Aug. 22, 2023 issued in corresponding Indonesian application No. P00202204699; English translation included (5 pages).

\* cited by examiner

AIRBAG DEVICE FOR SADDLED VEHICLE

TECHNICAL FIELD

The present invention relates to an airbag device for a saddled vehicle.

BACKGROUND ART

In the related art, an airbag device for a saddled vehicle including: a retainer provided behind a head pipe; an inflator; and an airbag accommodated in the retainer, the airbag being configured to be expanded by gas released by the inflator and deployed in front of a passenger is known (see Patent Literature 1, for example). According to Patent Literature 1, the inflator is disposed immediately behind the head pipe and is located at the center of a vehicle width, and the retainer has a box shape extending straight in the up-down direction.

CITATION LIST

Patent Literature

[Patent Literature 1]
Japanese Patent Laid-Open No. 2015-145151

SUMMARY OF INVENTION

Technical Problem

While it is conceivable to design a retainer for accommodating an inflator in a shape corresponding to a position where the inflator is disposed, difficulty may increase in manufacturing the retainer as the shape of the retainer is more complex.

An object the present invention, which has been made in view of the aforementioned circumstances, is to enable a retailer to be easily manufactured in accordance with the position where an inflator is disposed.

Solution to Problem

An airbag device for a saddled vehicle includes: a retainer (41) provided behind a head pipe (15); an inflator (43); and an airbag (42) accommodated in the retainer (41), the airbag being configured to be expanded by gas released by the inflator (43) and deployed in front of a passenger, the retainer (41) has a box shape formed by assembling a plurality of components, the inflator (43) is disposed to be offset outward in a vehicle width direction relative to the head pipe (15), a first component (51) covers the inflator (43) from a vehicle front side, a second component (52) is provided behind the head pipe (15), and a third component (53) is provided on a side of the passenger and is fitted to the second component (52) and the first component (51) from a back side.

Also, in the aforementioned configuration, secured locations (51b, 60, 61, 62, 63, 64) of the first component (51) with respect to the second component (52) and the third component (53) may be located around the inflator (43).

Also, in the aforementioned configuration, the second component (52) may be provided with a fastening portion (73) that secures the retainer (41) to a vehicle body (10).

Moreover, in the aforementioned configuration, the third component (53) may be provided with a guide portion (94) that guides a flow of the gas inward in the vehicle width direction with a stepped shape (93) inside the retainer (41).

Also, in the aforementioned configuration, the first component (51) may include an inflator support portion (78) supporting the inflator (43), the first component (51) and the second component (52) may be joined to form a front-side case (55), and the third component (53) may be joined to the front-side case (55).

In addition, in the aforementioned configuration, the retainer (41) may have an L shape including: an upward/downward extending portion (45) extending in an up-down direction and having an upper end portion from which the airbag (42) is deployed; and a sideward extending portion (46) extending outward in the vehicle width direction from the upward/downward extending portion (45), and the front-side case (55) in an L shape and the third component (53) in an L shape may be joined to each other.

Also, in the aforementioned configuration, the first component (51) and the second component (52) may be joined through welding, and the third component (53) is detachably fastened to the front-side case (55).

Also, in the aforementioned configuration, the inflator (43) may be disposed in an orientation such that an axial line (43c) of the inflator (43) is directed in a vehicle front-back direction, the first component (51) may support the inflator (43) with the inflator (43) covered from a front side and is joined to the second component (52), and the third component (53) may be fitted to the first component (51) and the second component (52) from the back side.

In addition, in the aforementioned configuration, the inflator (43) may be supported by the first component (51), and at least a part of the first component (51) is provided at a position in front of the head pipe (15) and outward in the vehicle width direction relative to the head pipe (15).

Advantageous Effects of Invention

The airbag device for a saddled vehicle includes: the retainer provided behind the head pipe; the inflator; and the airbag accommodated in the retainer, the airbag being configured to be expanded by the gas released by the inflator and deployed in front of the passenger, the retainer has the box shape formed by assembling the plurality of components, the inflator is disposed to be offset outward in the vehicle width direction relative to the head pipe, the first component covers the inflator from the vehicle front side, the second component is provided behind the head pipe, and the third component is provided on the side of the passenger and is fitted to the second component and the first component from the back side.

With this configuration, in a case in which the inflator is disposed to be offset outward in the vehicle width direction relative to the head pipe, the retainer is formed by assembling the first component covering the inflator from the vehicle front side, the second component provided behind the head pipe, and the third component provided on the side of the passenger and fitted to the second component and the first component from the back side. It is thus possible to reduce the size of a mold for manufacturing each of the first component, the second component, and the third component and to easily manufacture the retainer. In particular, it is possible to easily form the first component that tends to have a complicated shape by individually forming the first component disposed to be offset outward in the vehicle width direction relative to the head pipe and covering the inflator in a vehicle front-back direction.

Also, in the aforementioned configuration, the secured locations of the first component with respect to the second component and the third component may be located around the inflator.

With this configuration, the secured locations of the first component with respect to the second component and the third component are gathered around the inflator, and it is thus possible to easily achieve securing at the secured locations of the first component and to effectively receive a gas injection pressure of the inflator at the secured locations.

Also, in the aforementioned configuration, the second component may be provided with the fastening portion that secures the retainer to the vehicle body.

With this configuration, the second component provided behind the head pipe is provided with the fastening portion, and it is thus possible to secure the retainer to the vehicle body with a simple structure.

Moreover, in the aforementioned configuration, the third component may be provided with the guide portion that guides the flow of the gas inward in the vehicle width direction with the stepped shape inside the retainer.

With this configuration, it is possible to cause the gas from the inflator that is offset outward in the vehicle width direction to flow inward in the vehicle width direction with the guide portion and to efficiently deploy the airbag.

Also, in the aforementioned configuration, the first component may include the inflator support portion supporting the inflator, the first component and the second component may be joined to form the front-side case, and the third component may be joined to the front-side case.

With this configuration, the first component supporting the inflator support portion is individually constituted, and it is thus possible to easily form the first component that tends to have a complicated shape. Also, since the third component is joined to the front-side case in which the first component and the second component are joined, it is possible to easily form the retainer into a box shape.

Also, in the aforementioned configuration, the retainer may have the L shape including: the upward/downward extending portion extending in the up-down direction and having the upper end portion from which the airbag is deployed; and the sideward extending portion extending outward in the vehicle width direction from the upward/downward extending portion, and the front-side case in the L shape and the third component in the L shape may be joined to each other.

With this configuration, it is possible to easily manufacture the retainer in the L shape by joining the front-side case in the L shape to the third component in the L shape.

Also, in the aforementioned configuration, the first component and the second component may be joined through welding, and the third component may be detachably fastened to the front-side case.

With this configuration, it is possible to achieve satisfactory strength of the front-side case through the welding between the first component and the second component. In addition, the third component can be attached to and detached from the front-side case, which contributes to an improvement in an assembling property of the airbag device.

Also, in the aforementioned configuration, the inflator may be disposed in the orientation such that the axial line of the inflator is directed in the vehicle front-back direction, the first component may support the inflator with the inflator covered from the front side and may be joined to the second component, and the third component may be fitted to the first component and the second component from the back side.

With this configuration, it is possible to satisfactorily support, by the first component covering the inflator from the front side, the inflator disposed in the orientation such that the axial line is directed in the vehicle front-back direction. In addition, it is possible to easily form the retainer into a box shape by fitting the third component to the first component and the second component from the back side.

Also, in the aforementioned configuration, the inflator may be supported by the first component, and at least a part of the first component may be provided at the position in front of the head pipe and outward in the vehicle width direction.

With this configuration, it is possible to compactly dispose the first component supporting the inflator at the position in front of the head pipe and outward in the vehicle width direction relative to the head pipe. Also, since the first component provided in front of the second component that is disposed behind the head pipe is individually formed relative to the second component, it is possible to easily manufacture the retainer even in a case in which the retainer is formed into a complicated shape.

DESCRIPTION OF EMBODIMENTS

Hereinafter, an embodiment of the present invention will be described with reference to the drawings. Note that description of directions such as front, back, left, right, up and down are assumed to be the same as directions relative to a vehicle body unless otherwise particularly indicated. Also, the reference sign FR illustrated in each drawing represents a vehicle body front side, the reference sign UP represents a vehicle body upper side, and the reference sign LH represents a vehicle body left side.

First Embodiment

Figure 1:
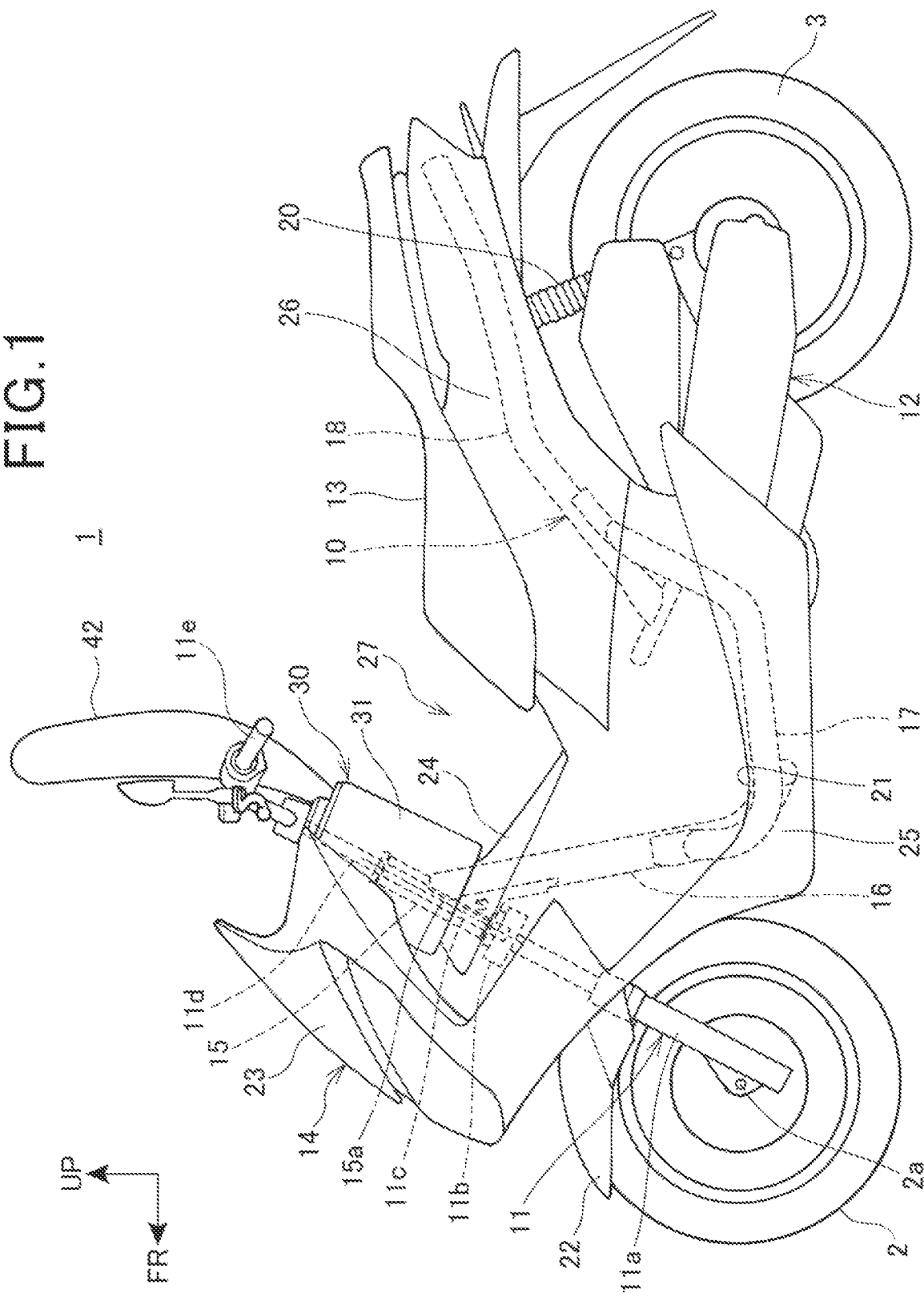
FIG. 1 is a left side view of a motorcycle according to a first embodiment of the present invention.

FIG. 1 is a left side view of a motorcycle 1 according to a first embodiment of the present invention.

The motorcycle 1 is a scooter saddled vehicle including a vehicle body frame 10 (vehicle body), a steering system 11 that supports a front wheel 2 such that the steering system 11 can steer the front wheel 2, a power unit 12 that is supported at a back portion of the vehicle body frame 10, a rear wheel 3, and a seat 13 in which a passenger is seated in a straddling manner.

Also, the motorcycle 1 includes a vehicle body cover 14 that covers the vehicle body such as the vehicle body frame 10.

Figure 2:
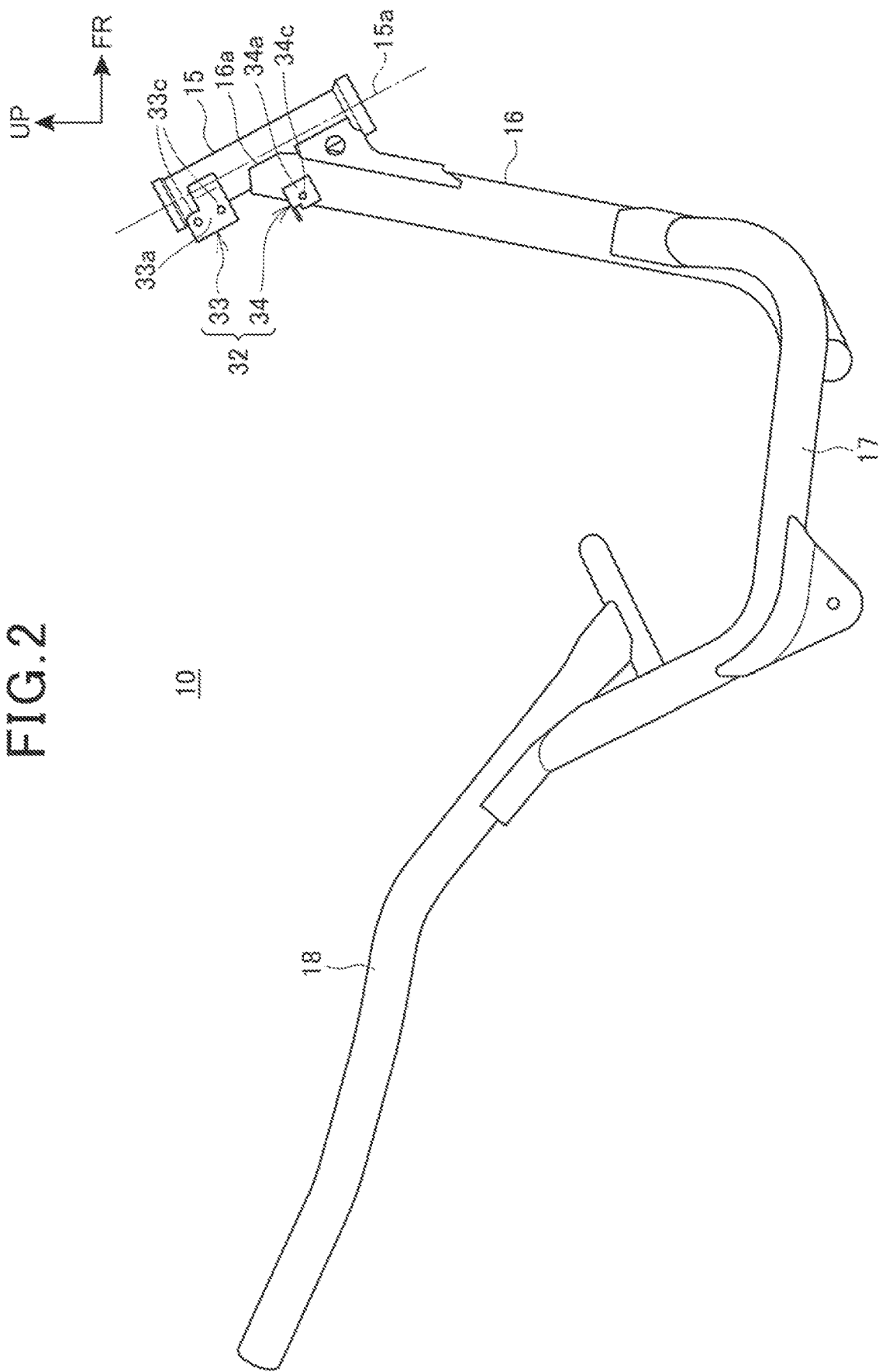
FIG. 2 is a right side view of a vehicle body frame.

FIG. 2 is a right side view of the vehicle body frame 10.

Referring to FIGS. 1 and 2, the vehicle body frame 10 includes a head pipe 15 provided at a front end portion of the vehicle body frame 10, a down frame 16 extending from a back surface of the head pipe 15 to the back lower side, a pair of left and right lower frames 17 extending from a lower end portion of the down frame 16 to the back side, and a pair of left and right seat frames 18 extending from back end portions of the lower frames 17 to the back upper side.

The head pipe 15 and the down frame 16 are located at the center of the vehicle width similarly to the front wheel 2.

The power unit 12 is a unit swing engine integrally including an engine that serves as a drive source of the rear wheel 3 and a swing arm that supports the rear wheel 3 such that the rear wheel 3 can swing. The power unit 12 is supported by the vehicle body frame 10 such that the power unit 12 can swing via a link mechanism (not illustrated) provided at a front portion of the power unit 12.

A rear suspension 20 is bridged between a back portion of the seat frame 18 and a back end portion of the power unit 12.

An accommodation box (not illustrated) supported by the seat frame 18 is disposed below the seat 13. The seat 13 is supported by the seat frame 18 via the accommodation box.

A pair of left and right plate-shaped step floors 21 on which the passenger seated in the seat 13 puts his/her feet are provided on a front lower side of the seat 13 and cover the lower frame 17 from the upper side.

The steering system 11 includes a pair of front forks 11a disposed on left and right sides of the front wheel 2, a bridge member 11b that couples upper end portions of the left and right front forks 11a in the vehicle width direction, a steering shaft 11c that extends upward from the center of the bridge member 11b and is rotatably supported by the head pipe 15, a handle post 11d that is secured to an upper end portion of the steering shaft 11c, and a steering handle 11e secured to an upper end of the handle post 11d.

An axial line 15a of the head pipe 15 is inclined backward relative to the vertical direction in a vehicle side view. An axial line of the rotation of the steering shaft 11c conforms to the axial line 15a. The handle post 11d obliquely extends from the side of the head pipe 15 to the back upper side along the axial line 15a.

The front wheel 2 is supported by an axle 2a that couples lower end portions of the front forks 11a in the left-right direction.

A front fender 22 that covers the front wheel 2 from the upper side is secured to the front forks 11a.

Figure 3:
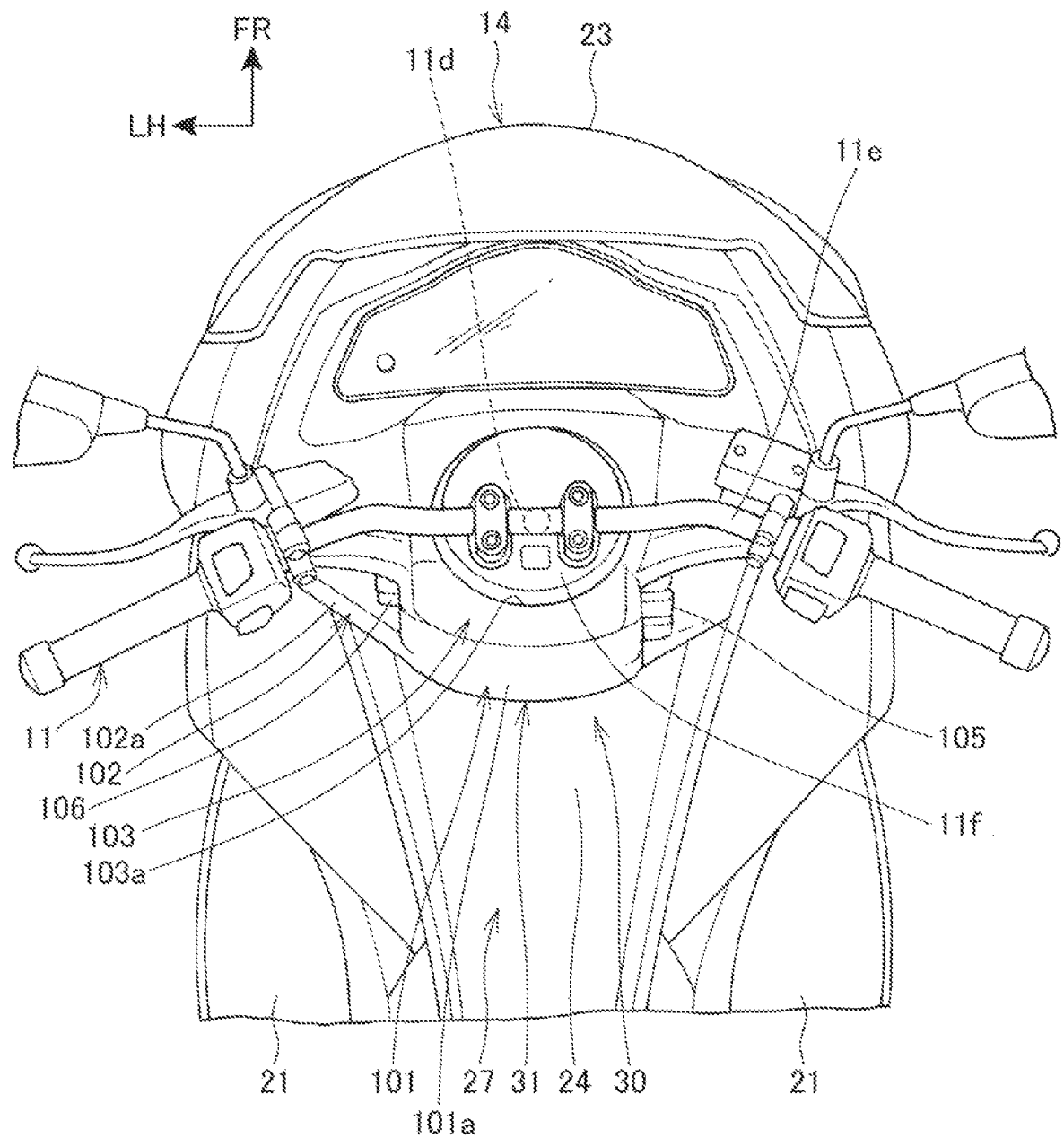
FIG. 3 is a view of a front portion of the motorcycle when seen from above on a passenger side.

FIG. 3 is a view of the front portion of the motorcycle 1 when seen from the upper side on the side of the passenger.

Referring to FIGS. 1 and 3, the vehicle body cover 14 includes a front cover 23 that covers the steering system 11 and the head pipe 15 from the front side, an inner cover 24 that covers the steering system 11 and the head pipe 15 from the back side, a lower cover 25 that covers the lower frame 17 from the outer side below the step floors 21, and a side cover 26 that covers the seat frame 18 from the outer side below the seat 13.

In a vehicle side view, a straddling space 27 recessed downward in a vehicle side view is sectioned between the inner cover 24 and the front end portion of the seat 13. The passenger can straddle the motorcycle 1 via the straddling space 27 when the passenger rides on and gets off the motorcycle 1.

Referring to FIGS. 1 and 3, the motorcycle 1 includes an airbag device 30 that protects the passenger from impact.

The airbag device 30 includes an airbag unit 31, an acceleration sensor (not illustrated) that detects impact against the motorcycle 1, and an airbag control device (not illustrated) that controls operations of the airbag unit 31 on the basis of a detection result of the acceleration sensor.

The airbag unit 31 is disposed on the back surface side of the inner cover 24 and is located in front of the passenger who is seated in the seat 13. Also, the airbag unit 31 is provided below the handle 11e behind the head pipe 15 and is located at the front portion of the straddling space 27.

A back portion of the airbag unit 31 is exposed from a notch portion provided at a center portion of the inner cover 24 to the straddling space 27 outside the vehicle body cover 14.

Figure 4:
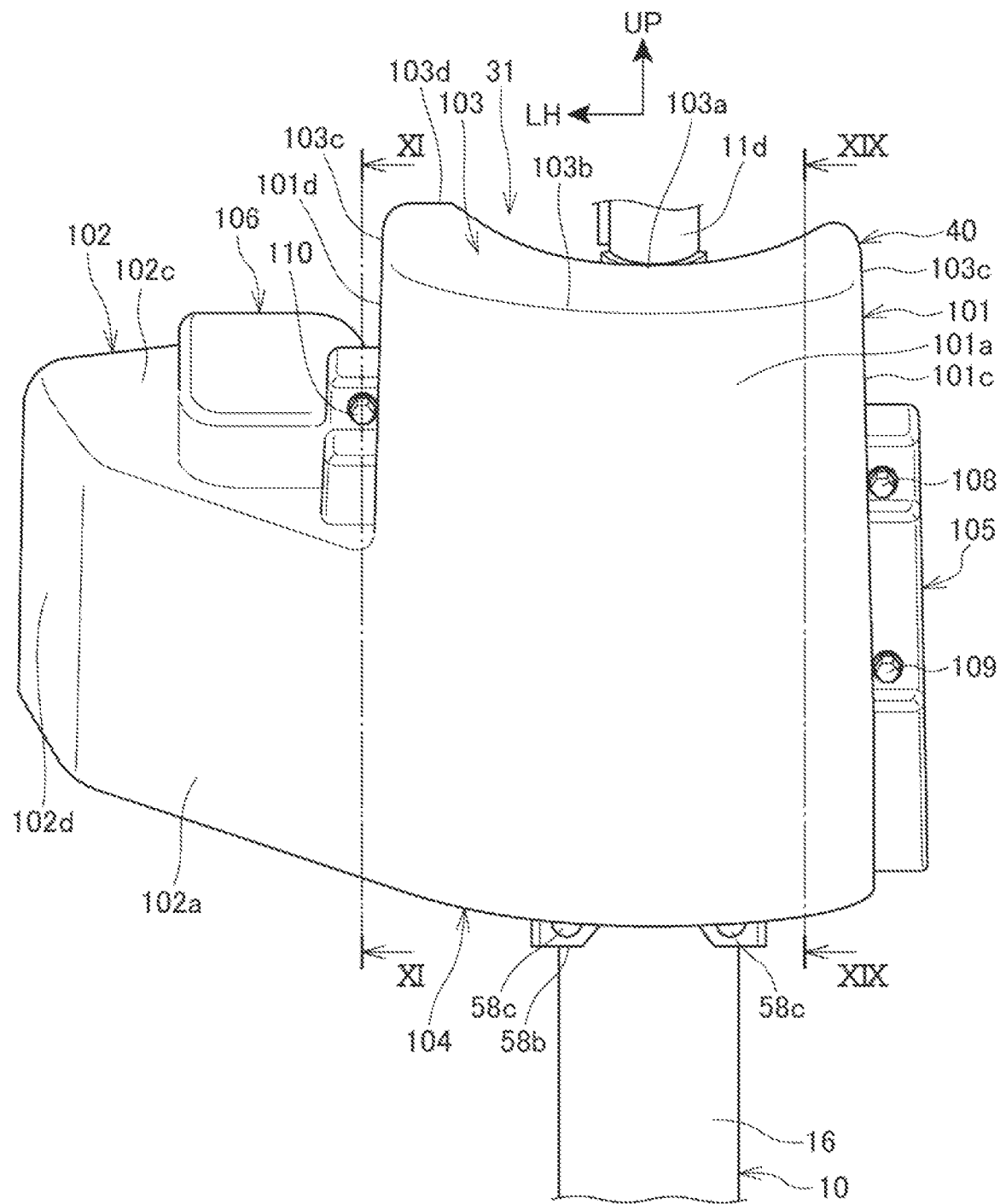
FIG. 4 is a view of an airbag unit attached to the vehicle body frame when seen from a back side.
Figure 5:
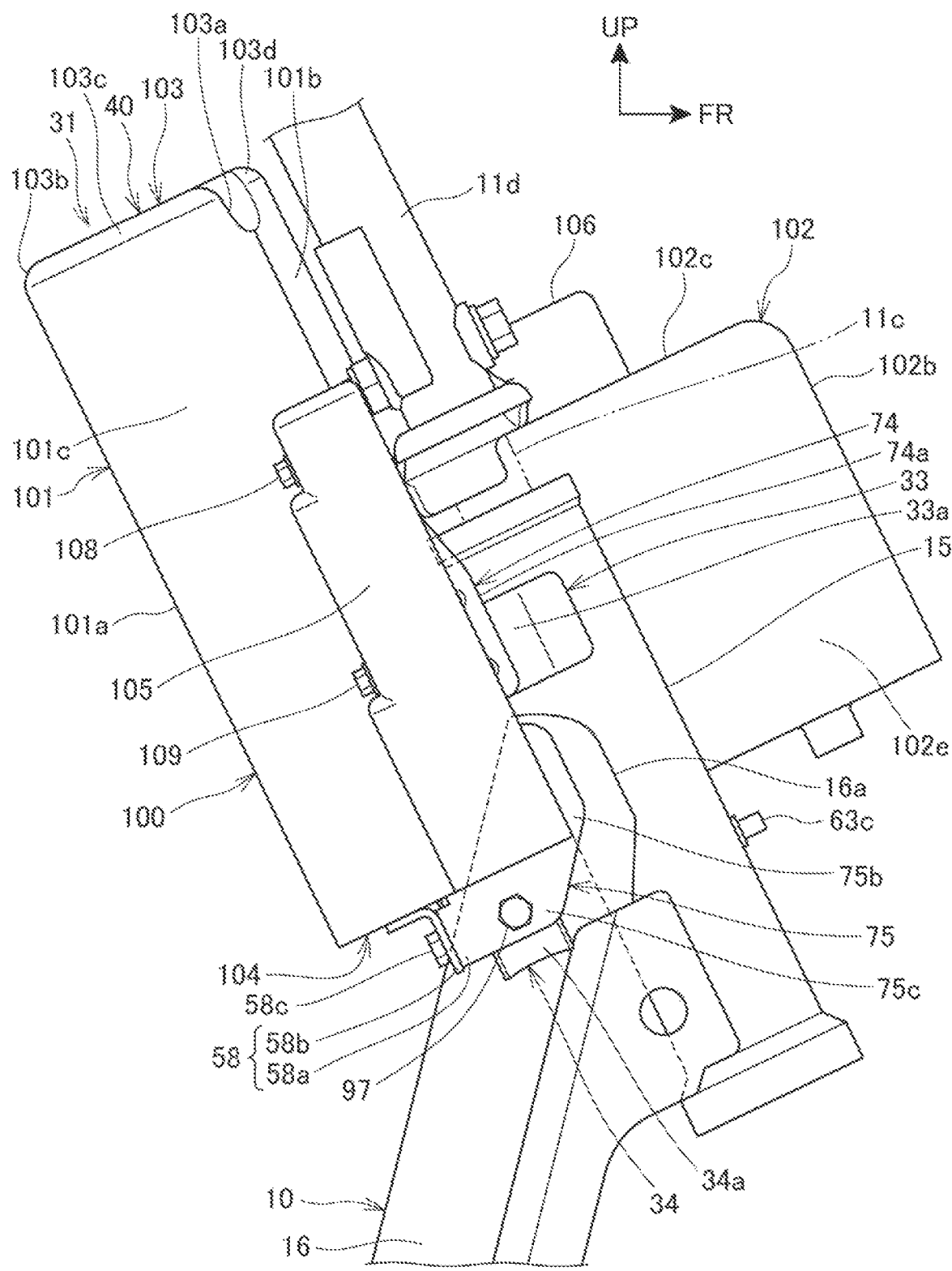
FIG. 5 is a right side view of the airbag unit attached to the vehicle body frame.
Figure 6:
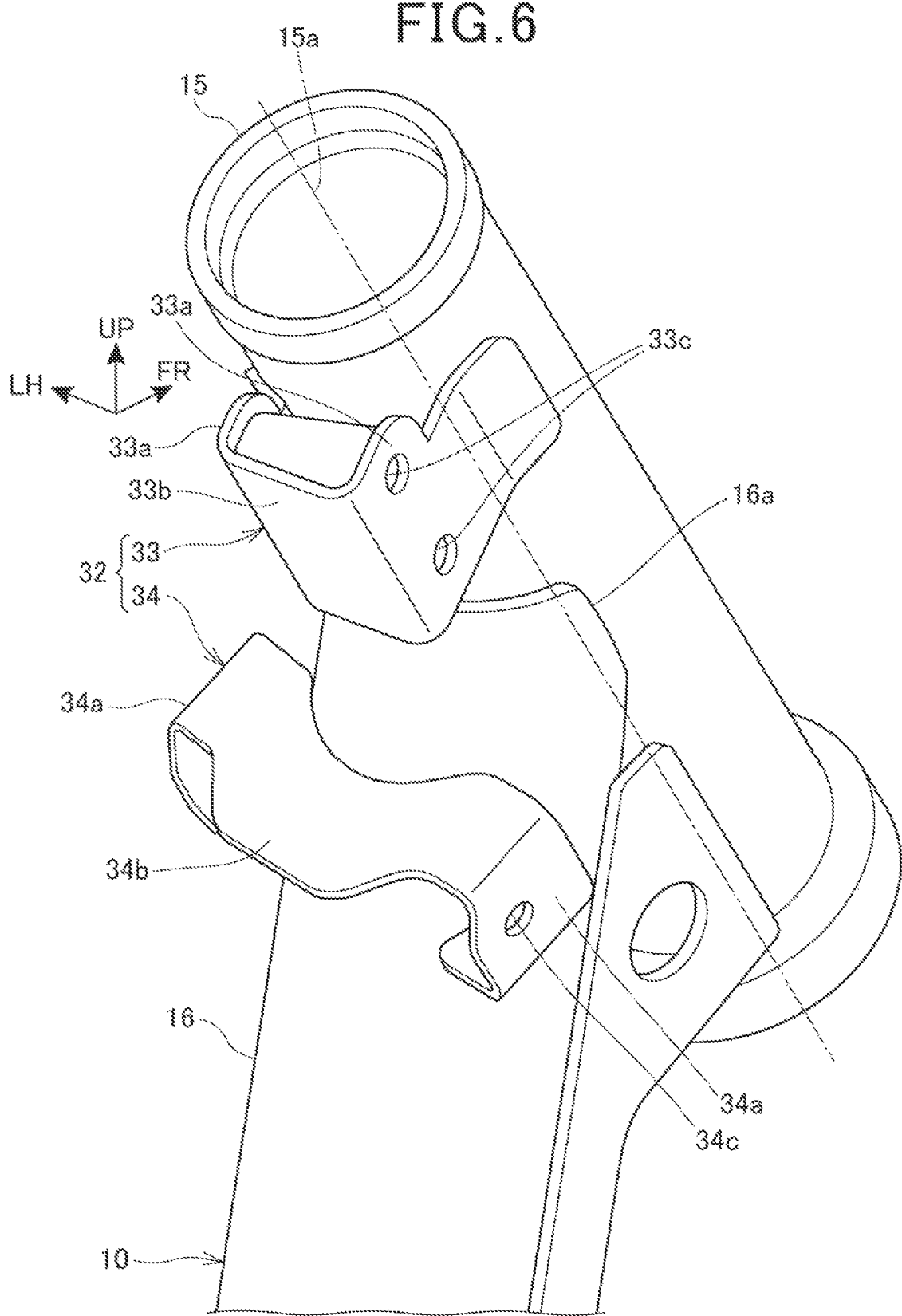
FIG. 6 is a perspective view of a front end portion of the vehicle body frame when seen from a right back side.

FIG. 4 is a view of the airbag unit 31 attached to the vehicle body frame 10 when seen from the back side. FIG. 5 is a right side view of the airbag unit 31 attached to the vehicle body frame 10. FIG. 6 is a perspective view of the front end portion of the vehicle body frame 10 when seen from the right back side.

Referring to FIGS. 4 to 6, the airbag unit 31 is disposed behind the head pipe 15 and the handle post 11d and is disposed with a backward inclination along the back surface of the head pipe 15 in a vehicle side view.

The airbag unit 31 is secured to a stay 32 provided at the front end portion of the vehicle body frame 10.

Referring to FIGS. 2, 5, and 6, the stay 32 includes a first stay 33 provided at the upper portion of the head pipe 15 and a second stay 34 provided at the upper portion of the down frame 16.

The first stay 33 is provided further upward than the connecting portion 16a between the head pipe 15 and the upper end of the down frame 16.

The first stay 33 includes a pair of first attachment portions 33a extending backward from left and right outer surfaces of the upper portion of the head pipe 15 and a plate-shaped connecting portion 33b connecting back ends of the left and right first attachment portions 33a in the vehicle width direction. The left and right first attachment portions 33a are provided with a plurality of securing hole portions 33c penetrating through the first attachment portions 33a in the vehicle width direction.

The second stay 34 is disposed below the first stay 33.

The second stay 34 includes a pair of second attachment portions 34a secured to left and right outer surfaces of the down frame 16 and a connecting portion 34b connecting the left and right second attachment portions 34a in the vehicle width direction behind the down frame 16. The left and right second attachment portions 34a are provided with securing hole portions 34c penetrating through the second attachment portions 34a in the vehicle width direction.

Figure 7:
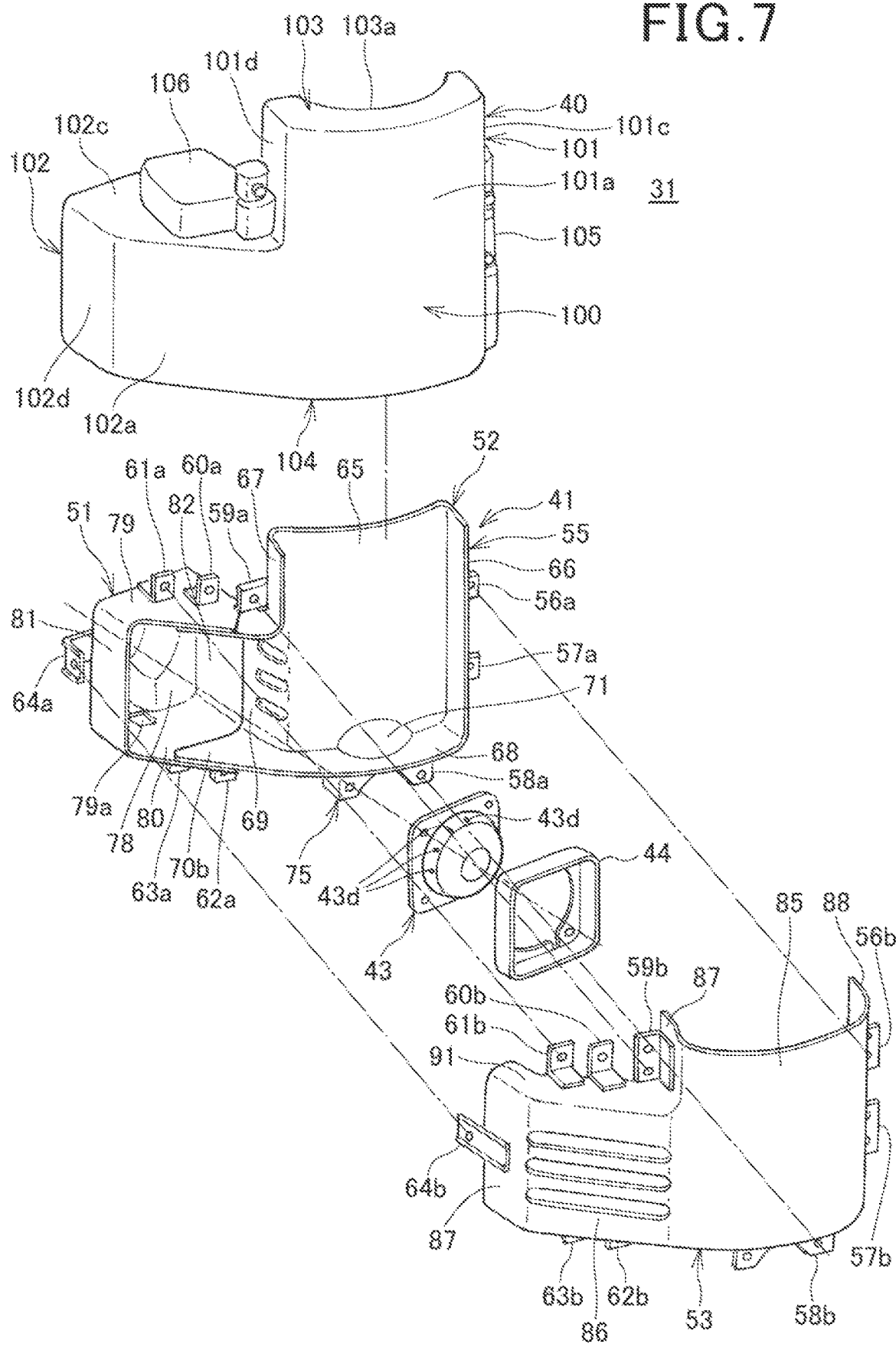
FIG. 7 is an exploded perspective view of the airbag unit.
Figure 8:
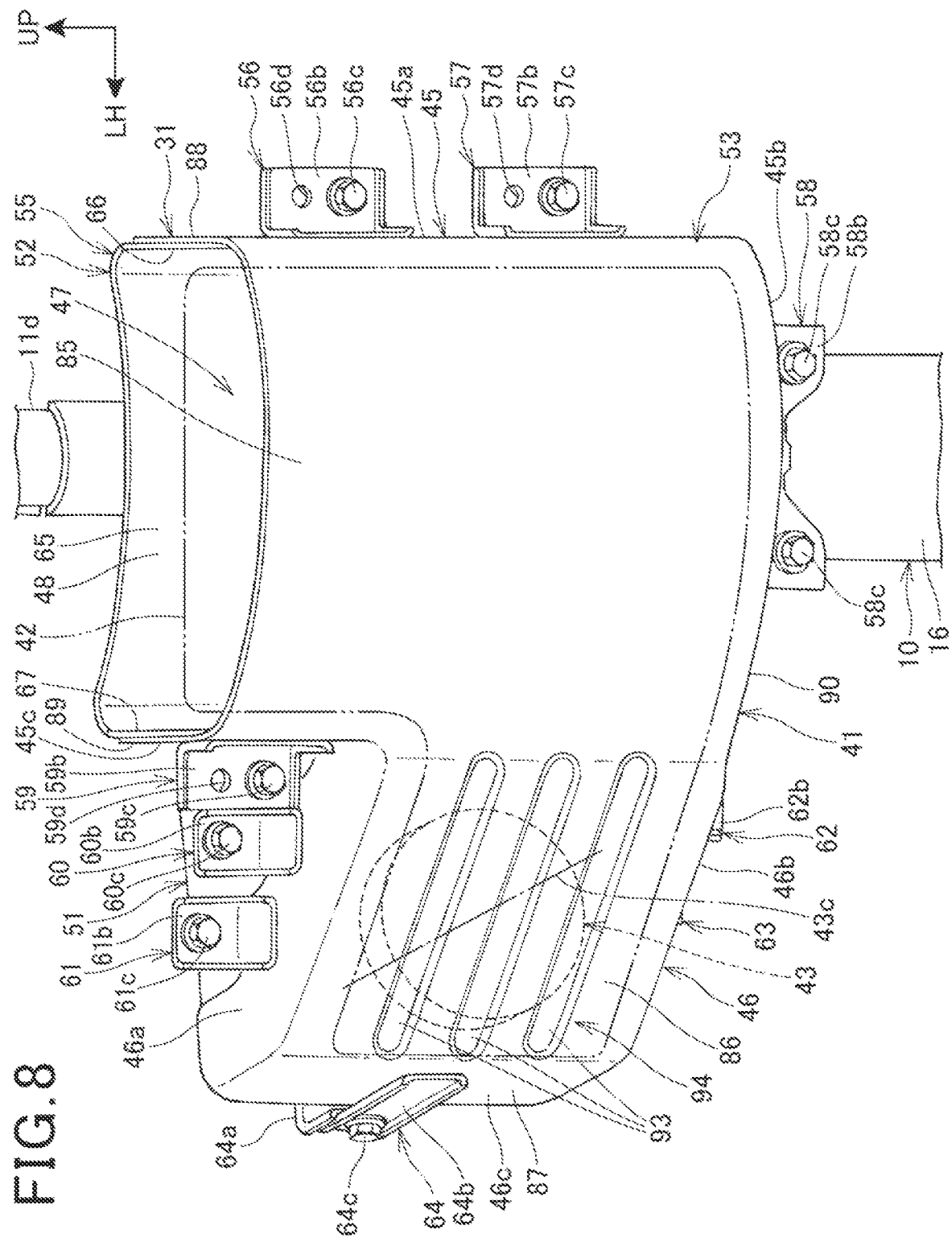
FIG. 8 is a view illustrating a state where an exterior member, which will be described later, has been detached from the state in FIG. 4.

FIG. 7 is an exploded perspective view of the airbag unit 31. FIG. 8 is a view illustrating a state where an exterior member 40, which will be described later, has been detached from the state in FIG. 4.

Referring to FIGS. 4, 7, and 8, the airbag unit 31 includes a box-shaped retainer 41 provided in front of the passenger who is seated in the seat 13 (FIG. 1), an airbag 42 accommodated in the retainer 41, an inflator 43 that releases gas into the airbag 42, a securing member 44 that secures the inflator 43 and the airbag 42 to the retainer 41, and the exterior member 40 that covers the retainer 41 from the outer side.

Referring to FIGS. 7 and 8, the retainer 41 is a box-shaped member formed into an inverted L shape when seen from the side of the passenger (the vehicle back side). Note that the L shape in the following description means that the retainer 41 has an L shape when seen from the front side or the back side. Although the retainer 41 has an inverted L shape when seen from the back side, it is possible to state that the retainer 41 is formed into an L shape.

The retainer 41 is secured to the front end portion of the vehicle body frame 10 via the stay 32 (FIG. 2) and is located behind the head pipe 15 and the down frame 16.

The retainer 41 includes an upward/downward extending portion 45 extending in the up-down direction and a sideward extending portion 46 extending outward in the vehicle width direction from the lower portion side of the upward/downward extending portion 45.

The upward/downward extending portion 45 is a box-shaped portion extending in the up-down direction along the head pipe 15 and is inclined backward in a vehicle side view. The upward/downward extending portion 45 is located at the center of the vehicle width and overlaps the handle post 11d, the head pipe 15, and the upper end portion of the down frame 16 from the back side.

The sideward extending portion 46 is a box-shaped portion extending in the vehicle width direction. The sideward extending portion 46 passes through the outer side of the head pipe 15 from the side portion of the upward/downward extending portion 45 and extends outward in the vehicle width direction and forward.

The retainer 41 is formed into the L shape by the sideward extending portion 46 extending from the upward/downward extending portion 45. An L-shaped airbag passage 47 formed by an inner space of the upward/downward extending portion 45 and an inner space of the sideward extending portion 46 is formed inside the retainer 41.

An opening 48 through which the airbag passage 47 is exposed upward is formed in an upper surface of the upward/downward extending portion 45. The airbag 42 is deployed upward from the opening 48.

The inflator 43 is disposed inside the sideward extending portion 46 and is disposed to be offset outward in the vehicle width direction relative to the head pipe 15 located at the center of the vehicle width.

The retainer 41 is constituted into a box shape by assembling a plurality of components.

More specifically, the retainer 41 is formed by assembling a first component 51 (inflator accommodating portion) that covers the inflator 43 from the front side in the vehicle front-back direction, a second component 52 that is provided behind the head pipe 15, and a third component 53 that is provided on the side of the passenger and is fitted to the second component 52 and the first component 51 from the back side.

The first component 51 and the second component 52 are joined through welding, for example, and are integrated. A front-side case 55 constituting substantially a half of the retainer 41 on the front side is formed by the first component 51 and the second component 52 being joined to each other.

The third component 53 is a back-side case constituting substantially a half of the retainer 41 on the back side.

The retainer 41 is formed by causing the third component 53 to be joined to the front-side case 55 from the back side.

Figure 9:
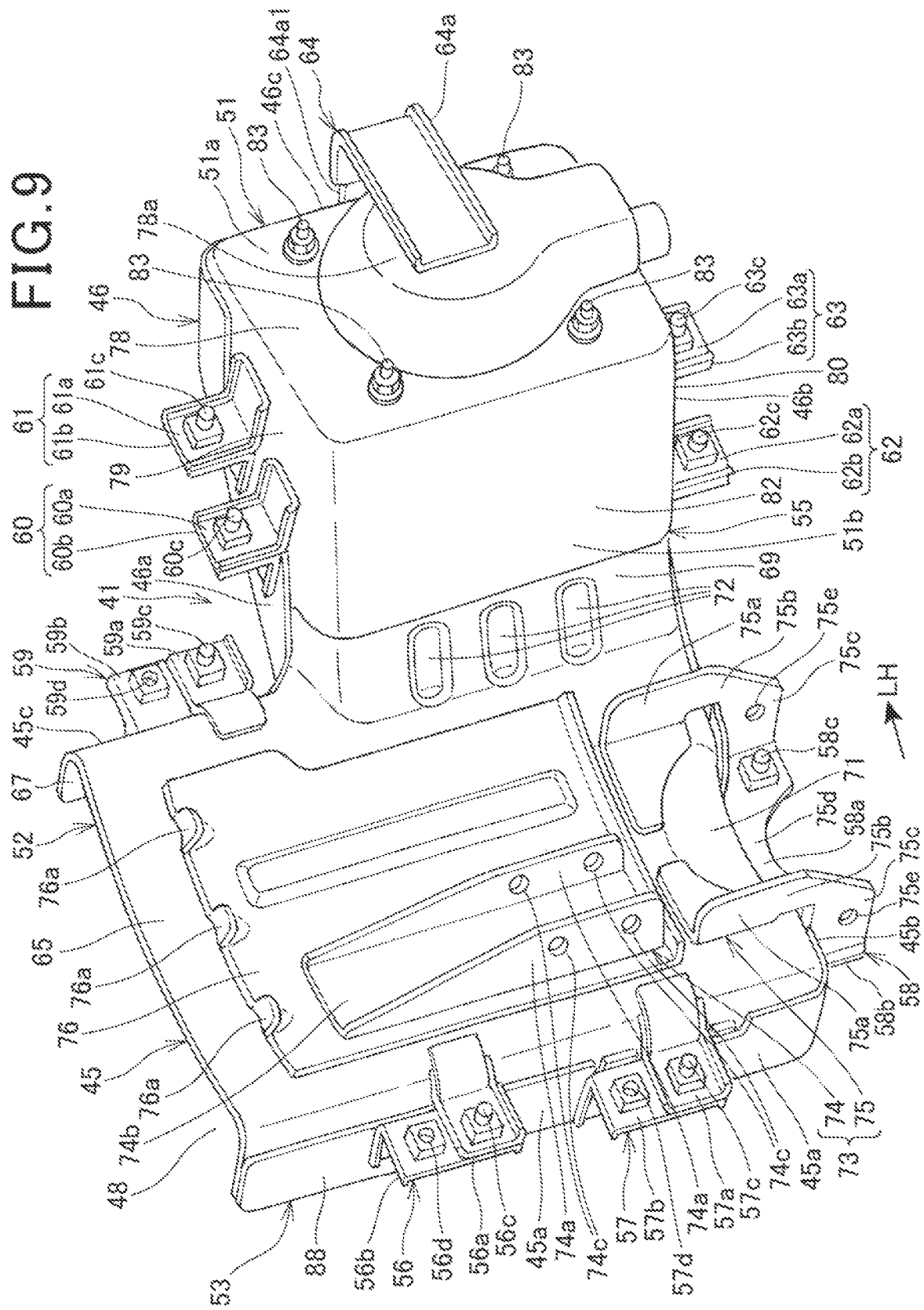
FIG. 9 is a perspective view of the retainer when seen from the front side.

FIG. 9 is a perspective view of the retainer 41 when seen from the front side.

Referring to FIGS. 7 to 9, the retainer 41 includes a first securing portion 56, a second securing portion 57, a third securing portion 58, a fourth securing portion 59, a fifth securing portion 60, a sixth securing portion 61, a seventh securing portion 62, an eighth securing portion 63, and a ninth securing portion 64 as securing portions that secure the front-side case 55 to the third component 53 through fastening.

The first securing portion 56 and the second securing portion 57 are provided in a side surface 45a on an opposite side of the sideward extending portion 46 out of left and right side surfaces of the upward/downward extending portion 45. The first securing portion 56 and the second securing portion 57 are provided to be aligned on the upper and lower sides in the side surface 45a.

The third securing portion 58 is provided in a lower surface 45b of the upward/downward extending portion 45.

The fourth securing portion 59 is provided in a side surface 45c on the side of the sideward extending portion 46 out of the left and right side surfaces of the upward/downward extending portion 45.

The fifth securing portion 60 and the sixth securing portion 61 are disposed to be aligned on the left and right sides in an upper surface 46a of the sideward extending portion 46.

The seventh securing portion 62 and the eighth securing portion 63 are disposed to be aligned on the left and right sides in a lower surface 46b of the sideward extending portion 46.

The ninth securing portion 64 is provided across an outer side surface 46c of the sideward extending portion 46 and a front surface 51a of the first component 51.

Figure 10:
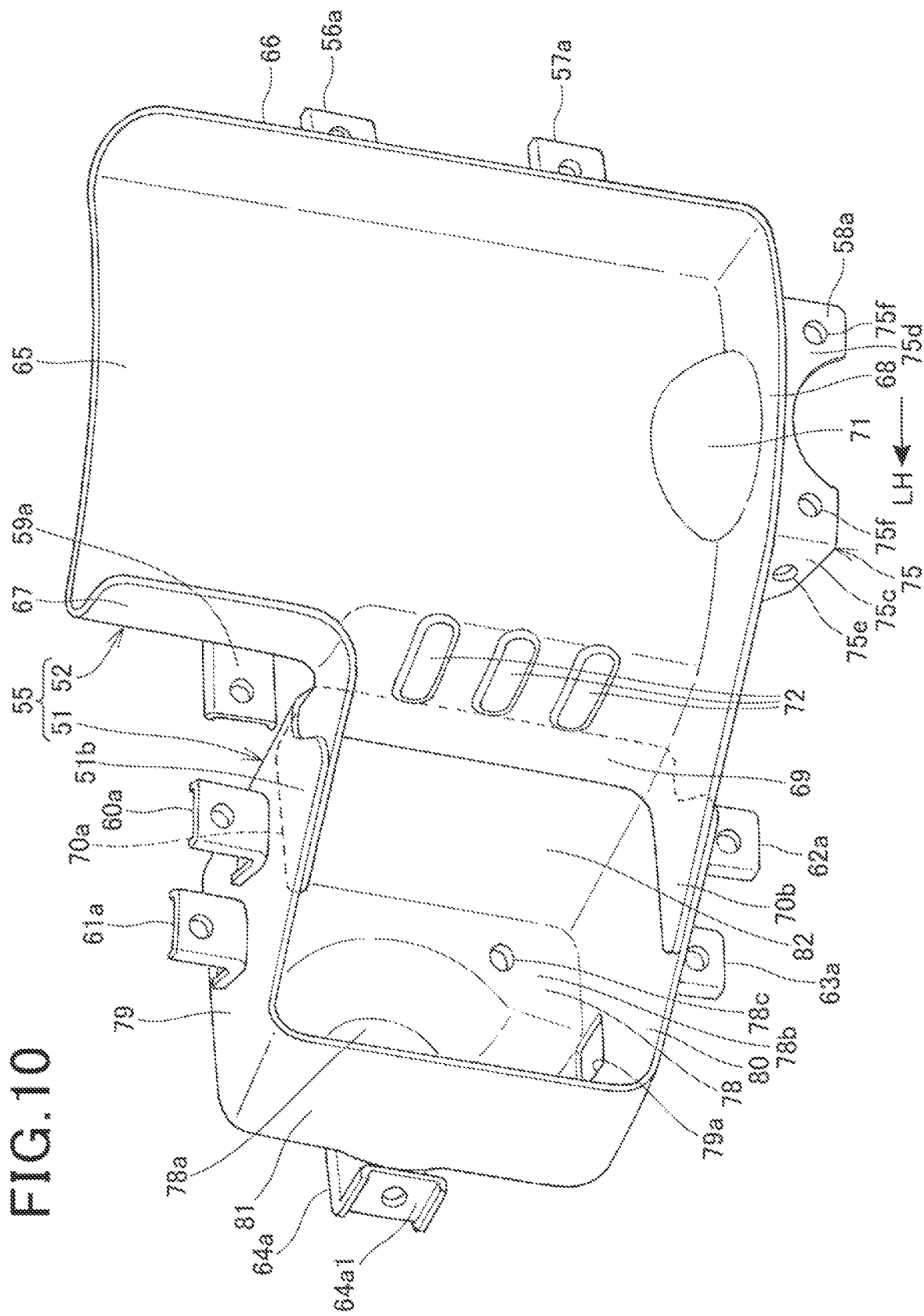
FIG. 10 is a perspective view of a front-side case when seen from the back side.

FIG. 10 is a perspective view of the front-side case 55 when seen from the back side.

Referring to FIGS. 7 to 10, the second component 52 includes a front wall portion 65 with a substantially rectangular shape that constitutes a front surface of the upward/downward extending portion 45, a one-side side wall 66 extending backward from a side edge on the opposite side of the sideward extending portion 46 out of left and right side edges of the front wall portion 65, an other-side side wall 67 extending backward from the side edge on the side of the sideward extending portion 46 out of the left and right side edges of the front wall portion 65, and a lower wall portion 68 extending backward from a lower edge of the front wall portion 65. The front wall portion 65 is a plate with an oblong shape that is long in the up-down direction. The other-side side wall 67 is formed at an upper portion of the front wall portion 65.

Also, the second component 52 includes an extending wall portion 69 extending outward in the vehicle width direction and on the vehicle front side from a side edge on the side of the sideward extending portion 46 and below the other-side side wall 67 out of the left and right side edges of the front wall portion 65. The extending wall portion 69 is continuous with the lower portion of the front wall portion 65.

Moreover, the second component 52 includes an extending portion upper wall 70a extending outward in the vehicle width direction and backward from an upper edge of the extending wall portion 69 and an extending portion lower wall 70b extending outward in the vehicle width direction and backward from a lower edge of the extending wall portion 69. The extending portion upper wall 70a is continuous with a lower end of the other-side side wall 67 while the extending portion lower wall 70b is continuous with a side portion of the lower wall portion 68.

A recessed portion 71 that causes the second component 52 to be recessed backward is formed at a lower end portion of the second component 52. The recessed portion 71 is a part at which a lower end portion of the front wall portion 65 and a front portion of the lower wall portion 68 are recessed to the inner side of the retainer 41. The recessed portion 71 is provided at a center portion of the front wall portion 65 in the width direction.

Ribbed stepped portions 72 projecting by one stage toward the inner side of the retainer 41 are provided in an inner surface of the extending wall portion 69. The stepped portions 72 are formed to be longer in the left-right direction than in the up-down direction and extend in the left-right direction inside the retainer 41.

The plurality of stepped portions 72 are disposed to be aligned in the up-down direction. The stepped portions 72 are formed by pushing parts of the extending wall portion 69 out from the outer side to the inner side of the retainer 41.

Referring to FIG. 9, a fastening portion 73 that fastens the retainer 41 to the stay 32 of the vehicle body frame 10 is provided in the front surface of the front wall portion 65 of the second component 52.

More specifically, the fastening portion 73 includes a first fastening member 74 that is fastened to the first stay 33 of the head pipe 15 and a second fastening member 75 that is fastened to the second stay 34 of the down frame 16.

A reinforcing member 76 with a substantially rectangular plate shape is attached to the front surface of the front wall portion 65 of the second component 52. The reinforcing member 76 extends from a lower portion to an upper end portion of the front wall portion 65.

The first fastening member 74 is secured to a front surface of the reinforcing member 76.

The first fastening member 74 includes a pair of securing plate portions 74a facing each other in the vehicle width direction (left-right direction) and a connecting plate portion 74b that connects back edges of the securing plate portions 74a in the vehicle width direction.

The connecting plate portion 74b of the first fastening member 74 is secured to the front surface of the reinforcing member 76. Each securing plate portion 74a projects forward relative to the reinforcing member 76. Each securing plate portion 74a is provided with a securing hole portion 74c that penetrates through the securing plate portion 74a in the vehicle width direction.

A plurality of hook-shaped engagement portions 76a projecting forward are provided to be aligned in the vehicle width direction at an upper end of the reinforcing member 76.

The second fastening member 75 is secured to the lower end portion of the front surface of the front wall portion 65 below the first fastening member 74.

The second fastening member 75 includes a pair of left and right forward extending portions 75a extending forward at positions on left and right sides of the recessed portion 71 in the front surface of the front wall portion 65, a pair of left and right downward extending portions 75b extending downward from the forward extending portions 75a, a pair of left and right backward extending portions 75c extending backward from the downward extending portions 75b, and a connecting portion 75d that connects back ends of the left and right backward extending portions 75c in the left-right direction.

The left and right backward extending portions 75c and the connecting portion 75d are located below the lower wall portion 68 of the second component 52 and is below the recessed portion 71.

Each of the left and right backward extending portions 75c is provided with a securing hole portion 75e penetrating through the backward extending portion 75c in the vehicle width direction. The left and right backward extending portions 75c are located outward in the vehicle width direction relative to the recessed portion 71.

The connecting portion 75d is provided with a securing hole portion 75f (FIG. 10) that penetrates through the connecting portion 75d in the front-back direction.

The second component 52 includes a first securing piece 56a and a second securing piece 57a that extend outward in the vehicle width direction from the one-side side wall 66.

Also, the second component 52 includes a third securing piece 58a extending to a lower side of the lower wall portion 68. The third securing piece 58a is a connecting portion 75d of the second fastening member 75 and is formed integrally with the second fastening member 75.

Moreover, the second component 52 includes a fourth securing piece 59a extending outward in the vehicle width direction from the other-side side wall 67.

Referring to FIGS. 7 to 10, the first component 51 is a box-shaped component with a back portion opened backward.

The first component 51 includes a substantially rectangular wall portion 78 that covers the inflator 43 from the front side, an upper wall portion 79 that extends backward from an upper edge of the wall portion 78, a lower wall portion 80 that extends backward from a lower edge of the wall portion 78, an outer side wall portion 81 extending backward from a side edge of the wall portion 78 on the outer side in the vehicle width direction, and an inner side wall portion 82 extending backward from a side edge of the wall portion 78 on the inner side in the vehicle width direction.

The first component 51 is an inflator accommodating portion that accommodates the inflator 43 inside the box shape.

The wall portion 78 of the first component 51 is an inflator support portion that supports the inflator 43.

Figure 11:
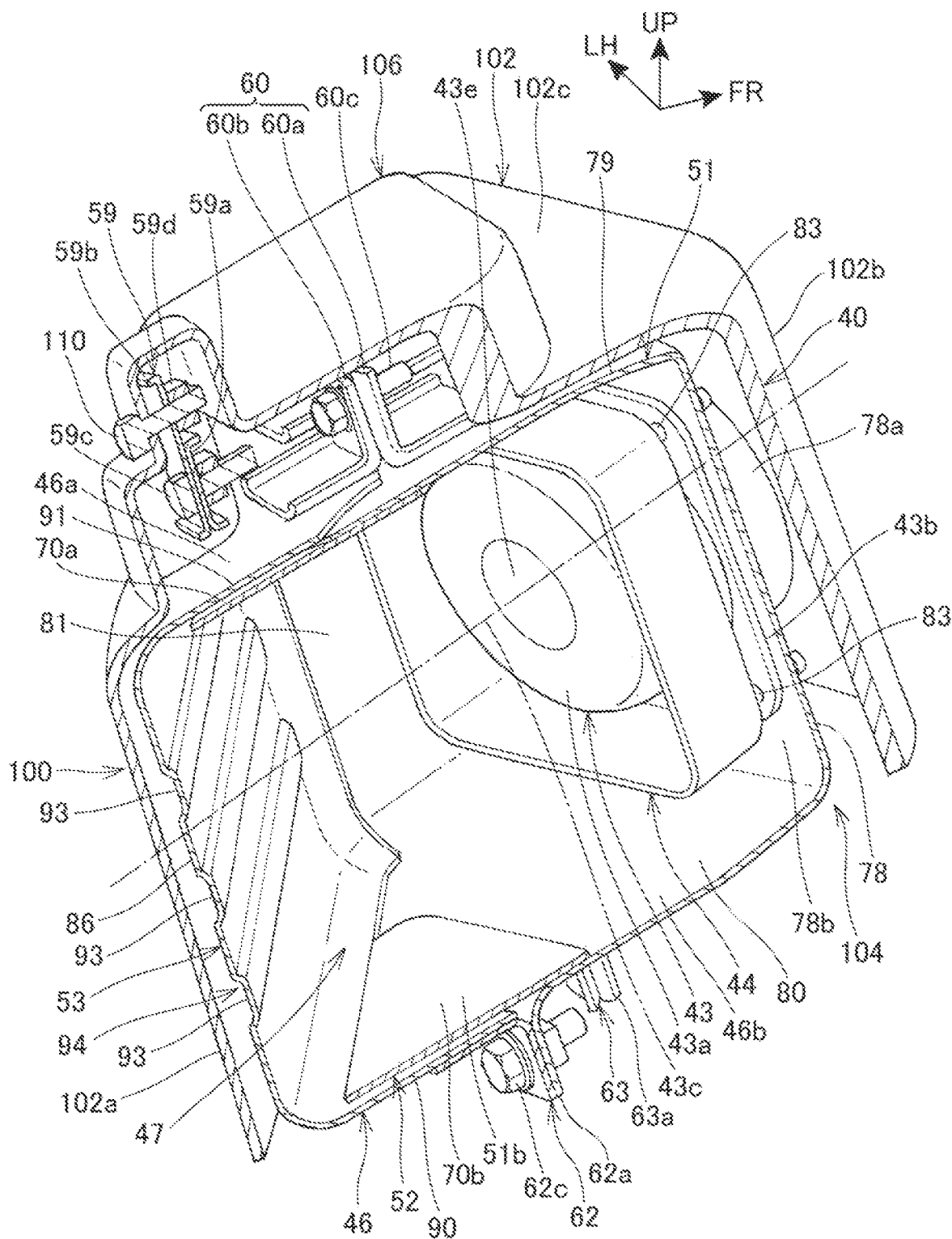
FIG. 11 is a sectional view along XI-XI in FIG. 4.

FIG. 11 is a sectional view along XI-XI in FIG. 4. In FIG. 11, the airbag 42 is not illustrated.

As illustrated in FIGS. 7 and 11, the inflator 43 includes a tubular inflator main body 43a that injects gas and a flange portion 43b that extends in a radial direction from an outer periphery of the inflator main body 43a.

The wall portion 78 of the first component 51 includes an accommodating portion 78a expanding on the front side at the center portion of the wall portion 78, a receiving surface portion 78b that is provided in the surroundings of the accommodating portion 78a and receives the flange portion 43b of the inflator 43, and a plurality of securing hole portions 78c provided in the receiving surface portion 78b.

The flange portion 43b of the inflator 43 is sandwiched between the receiving surface portion 78b and the securing member 44 with a frame shape. The inflator 43 is fastened to an inner surface of the wall portion 78 with the securing member 44, the flange portion 43b, and a plurality of securing tools 83 inserted into the securing hole portions 78c in the receiving surface portion 78b.

The front portion of the inflator main body 43a projecting forward from the flange portion 43b is accommodated in the accommodating portion 78a.

The inflator 43 is disposed in the inner surface of the wall portion 78 in an orientation such that an axial line 43c of the tubular inflator main body 43a is directed in the vehicle front-back direction in a vehicle side view. The wall portion 78 to which the flange portion 43b is secured is slightly inclined backward relative to the vertical direction in a vehicle side view. Therefore, the axial line 43c extends backward with an inclination toward the back lower side in a vehicle side view. Here, the inclination of the axial line 43c in a vehicle side view is smaller than 45° with respect to the horizontal direction. Also, the inflator 43 is disposed in an orientation such that the axial line 43c is close to the center of the vehicle width toward the vehicle back side in a plan view seen from the upper side.

The inflator 43 injects gas from a plurality of gas injection ports 43d (FIG. 7) provided in the outer periphery of the inflator main body 43a behind the flange portion 43b. The securing member 44 with a frame shape surrounds the gas injection ports 43d from the surroundings. The gas injected from the gas injection ports 43d is guided by the inner surface of the securing member 44 and flows backward.

The lower wall portion 80 of the first component 51 is provided with a wiring penetration hole 79a through which a wiring 49 (FIG. 13) that connects the inflator 43 to the airbag control device passes.

Referring to FIGS. 7 to 11, the first component 51 includes a fifth securing piece 60a and a sixth securing piece 61a extending upward from the upper wall portion 79.

Also, the first component 51 includes a seventh securing piece 62a and an eighth securing piece 63a extending downward from the lower wall portion 80.

Moreover, the first component 51 includes a ninth securing piece 64a extending outward in the vehicle width direction from the front surface of the wall portion 78. A distal end portion 64a1 of the ninth securing piece 64a is bent backward, and the distal end portion 64a1 is located on an outer side of the outer side wall portion 81.

Referring to FIGS. 9 and 10, the first component 51 is welded to the second component 52 by a weld-securing portion 51b (secured location) which is a part where the upper wall portion 79, the lower wall portion 80, and the inner side wall portion 82 overlap the second component 52 from the outer side.

More specifically, the upper wall portion 79 overlaps the extending portion upper wall 70a of the second component 52 from the upper side, the lower wall portion 80 overlaps the extending portion lower wall 70b of the second component 52 from the lower side, and the inner side wall portion 82 overlaps the extending wall portion 69 of the second component 52 from the inner side in the vehicle width direction, in the weld-securing portion 51b.

Figure 12:
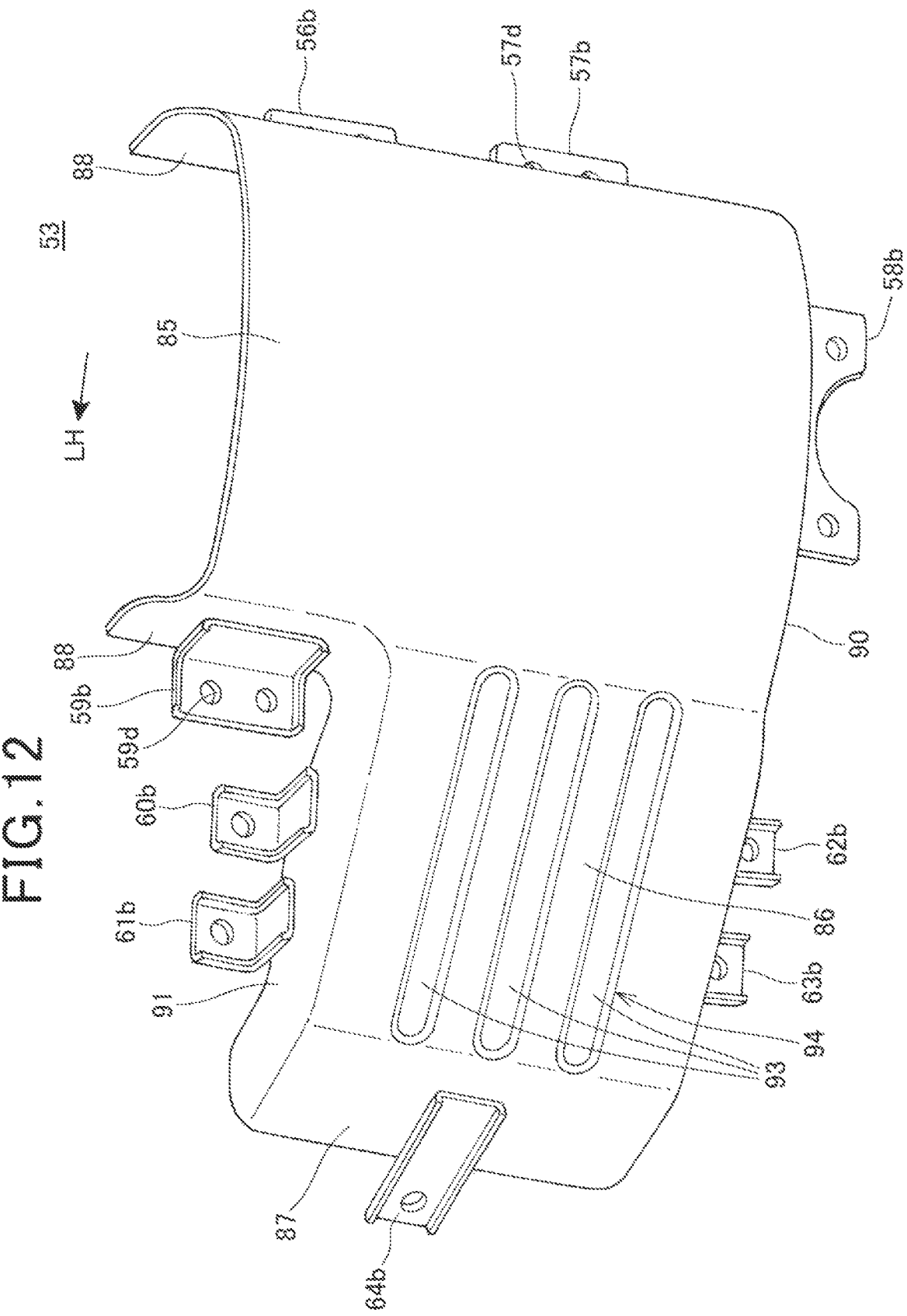
FIG. 12 is a perspective view of a third component when seen from the back side.

FIG. 12 is a perspective view of the third component 53 when seen from the back side.

Referring to FIGS. 7 to 9 and 12, the third component 53 includes a substantially rectangular back wall portion 85 constituting a back surface of the upward/downward extending portion 45, a side portion back wall portion 86 constituting a back surface of the sideward extending portion 46, and an extending portion side wall 87 extending forward and outward in the vehicle width direction from an edge portion of the side portion back wall portion 86 on the outer side in the vehicle width direction. The back wall portion 85 is a plate with an oblong shape that is long in the up-down direction. The side portion back wall portion 86 extends outward in the vehicle width direction from the side of the lower portion of the back wall portion 85.

Also, the third component 53 includes a one-side side wall 88 that extends forward from a side edge on the opposite side of the sideward extending portion 46 out of left and right side edges of the back wall portion 85 and an other-side side wall 89 extending forward from the side edge on the side of the sideward extending portion 46 out of the left and right side edges of the back wall portion 85. The other-side side wall 89 is formed at the upper portion of the back wall portion 85.

Moreover, the third component 53 includes a lower wall portion 90 that extends forward from a lower edge of the back wall portion 85, a lower edge of the side portion back wall portion 86, and a lower edge of the extending portion side wall 87 and an extending portion upper wall 91 that extends forward from an upper edge of the side portion back wall portion 86 and an upper edge of the extending portion side wall 87. The extending portion upper wall 91 is continuous with the lower end of the other-side side wall 89.

Referring to FIGS. 11 and 12, the side portion back wall portion 86 of the third component 53 faces a back surface 43e of the inflator main body 43a. The axial line 43c of the inflator main body 43a intersects the side portion back wall portion 86 of the retainer 41.

The inner surface of the side portion back wall portion 86 is provided with stepped shapes 93 projecting by one stage toward the inner side of the retainer 41. The stepped shapes 93 are formed into rib shapes that are longer in the left-right direction than in the up-down direction and extend in the left-right direction inside the retainer 41.

The plurality of stepped shapes 93 are disposed to be aligned in the up-down direction. The plurality of stepped shapes 93 disposed to be aligned in the up-down direction constitutes a guide portion 94 that guides a flow of gas injected by the inflator 43 in the vehicle width direction.

The stepped shapes 93 are formed by pushing parts of the side portion back wall portion 86 out from the outer side to the inner side of the retainer 41.

The third component 53 includes a first securing piece 56b and a second securing piece 57b extending outward in the vehicle width direction from the one-side side wall 88.

Also, the third component 53 includes a third securing piece 58b extending downward from a part of the lower wall portion 90 below the back wall portion 85.

Also, the third component 53 includes a fourth securing piece 59b extending outward in the vehicle width direction from the other-side side wall 89.

Moreover, the third component 53 includes a fifth securing piece 60b and a sixth securing piece 61b extending upward from the extending portion upper wall 91.

In addition, the third component 53 includes a seventh securing piece 62b and an eighth securing piece 63b extending downward from a part of the lower wall portion 90 below the side portion back wall portion 86.

Moreover, the third component 53 includes a ninth securing piece 64b extending forward from the extending portion side wall 87.

Referring to FIGS. 8 to 10 and 12, the first securing piece 56a and the first securing piece 56b constitute the first securing portion 56. The first securing piece 56a and the first securing piece 56b are fastened with a fastening tool 56c inserted into the first securing portion 56 from the back side.

A first cover securing hole portion 56d to which the exterior member 40 is secured is provided above the fastening tool 56c at the first securing piece 56b.

The second securing piece 57a and the second securing piece 57b constitute the second securing portion 57. The second securing piece 57a and the second securing piece 57b are fastened with a fastening tool 57c inserted into the second securing portion 57 from the back side.

A second cover securing hole portion 57d to which the exterior member 40 is secured is provided above the fastening tool 57c at the second securing piece 57b.

The third securing piece 58a and the third securing piece 58b constitute the third securing portion 58. The third securing piece 58a and the third securing piece 58b are fastened with the fastening tool 58c inserted into the third securing portion 58 from the back side.

The fourth securing piece 59a and the fourth securing piece 59b constitute the fourth securing portion 59. The fourth securing piece 59a and the fourth securing piece 59b are fastened with a securing tool 59c inserted into the fourth securing portion 59 from the back side.

A third cover securing hole portion 59d to which the exterior member 40 is secured is provided above the fastening tool 59c at the fourth securing piece 59b.

The fifth securing piece 60a and the fifth securing piece 60b constitute the fifth securing portion 60. The fifth securing piece 60a and the fifth securing piece 60b are fastened with a fastening tool 60c inserted into the fifth securing portion 60 from the back side.

The sixth securing piece 61a and the sixth securing piece 61b constitute the sixth securing portion 61. The sixth securing piece 61a and the sixth securing piece 61b are fastened with a fastening tool 61c inserted into the sixth securing portion 61 from the back side.

The seventh securing piece 62a and the seventh securing piece 62b constitute the seventh securing portion 62. The seventh securing piece 62a and the seventh securing piece 62b are fastened with a fastening tool 62c inserted into the seventh securing portion 62 from the back side.

The eighth securing piece 63a and the eighth securing piece 63b constitute the eighth securing portion 63. The eighth securing piece 63a and the eighth securing piece 63b are fastened with a fastening tool 63c inserted into the seventh securing portion 62 from the back side.

A ninth securing piece 64a and the ninth securing piece 64b constitute the ninth securing portion 64. The ninth securing piece 64a and the ninth securing piece 64b are fastened with a fastening tool 64c inserted into the ninth securing portion 64 from the outer side.

Referring to FIGS. 7, 10, and 12, the front-side case 55 made up of the first component 51 and the second component 52 has an L-shaped outer shape when seen from the back side.

Also, the third component 53 has an L-shaped outer shape when seen from the back side.

The retainer 41 is formed into an L shape by assembling the third component 53 in the L shape with the front-side case 55 in the L shape such that the third component 53 is fitted thereto from the back side and achieving fastening at the first to ninth securing portions 56 to 64.

Referring to FIGS. 8, 9, 10, and 12, in the state in which fastening has been achieved at the first to ninth securing portions 56 to 64, the one-side side wall 88 overlaps the one-side side wall 66 from the outer side, the other-side side wall 89 overlaps the other-side side wall 67 from the outer side, the lower wall portion 90 overlaps the lower wall portion 68, the extending portion lower wall 70b, and the lower wall portion 80 from the outer side, the extending portion upper wall 91 overlaps the extending portion upper wall 70a and the upper wall portion 79 from the outer side, and the extending portion side wall 87 overlaps the outer side wall portion 81 from the outer side.

Each of the first component 51, the second component 52, and the third component 53 is a component that is individually manufactured. Most parts of the shapes of the first component 51, the second component 52, and the third component 53 are formed by pressing plate materials by using dedicated molds, for example. In this manner, the retainer 41 in the L shape is formed in a separated manner for the first component 51, the second component 52, and the third component 53, and it is thus possible to reduce the sizes of the molds for manufacturing the retainer 41 and to easily manufacture the retainer 41.

Although a part of the retainer 41 supporting the inflator 43 tends to have a complicated shape, the first component 51 including the wall portion 78 that serves as the inflator support portion is manufactured separately from the second component 52 and the third component 53, which facilitate manufacturing of the retainer 41.

The retainer 41 can be separated into the front-side case 55 and the third component 53 by fastening and loosening the first to ninth securing portions 56 to 64. This contributes to an improvement in an assembling property of the airbag device 30.

As illustrated in FIG. 8, the airbag 42 is accommodated in a folded state in the airbag passage 47 in the L shape inside the retainer 41 and is provided from the sideward extending portion 46 to the upward/downward extending portion 45.

The airbag 42 is connected to the inflator 43 by an upstream end of the airbag 42 along the gas flow being pinched between the securing member 44 and the flange portion 43b illustrated in FIG. 11.

The secured locations of the first component 51 with respect to the third component 53 are the fifth securing portion 60, the sixth securing portion 61, the seventh securing portion 62, the eighth securing portion 63, and the ninth securing portion 64.

Also, the secured location of the first component 51 with respect to the second component 52 is the weld-securing portion 51b (FIGS. 9 and 10).

The fifth to ninth securing portions 60 to 64 and the weld-securing portion 51b are disposed in the surroundings of the inflator 43 and are provided to surround the inflator 43 from the outer periphery.

Figure 13:
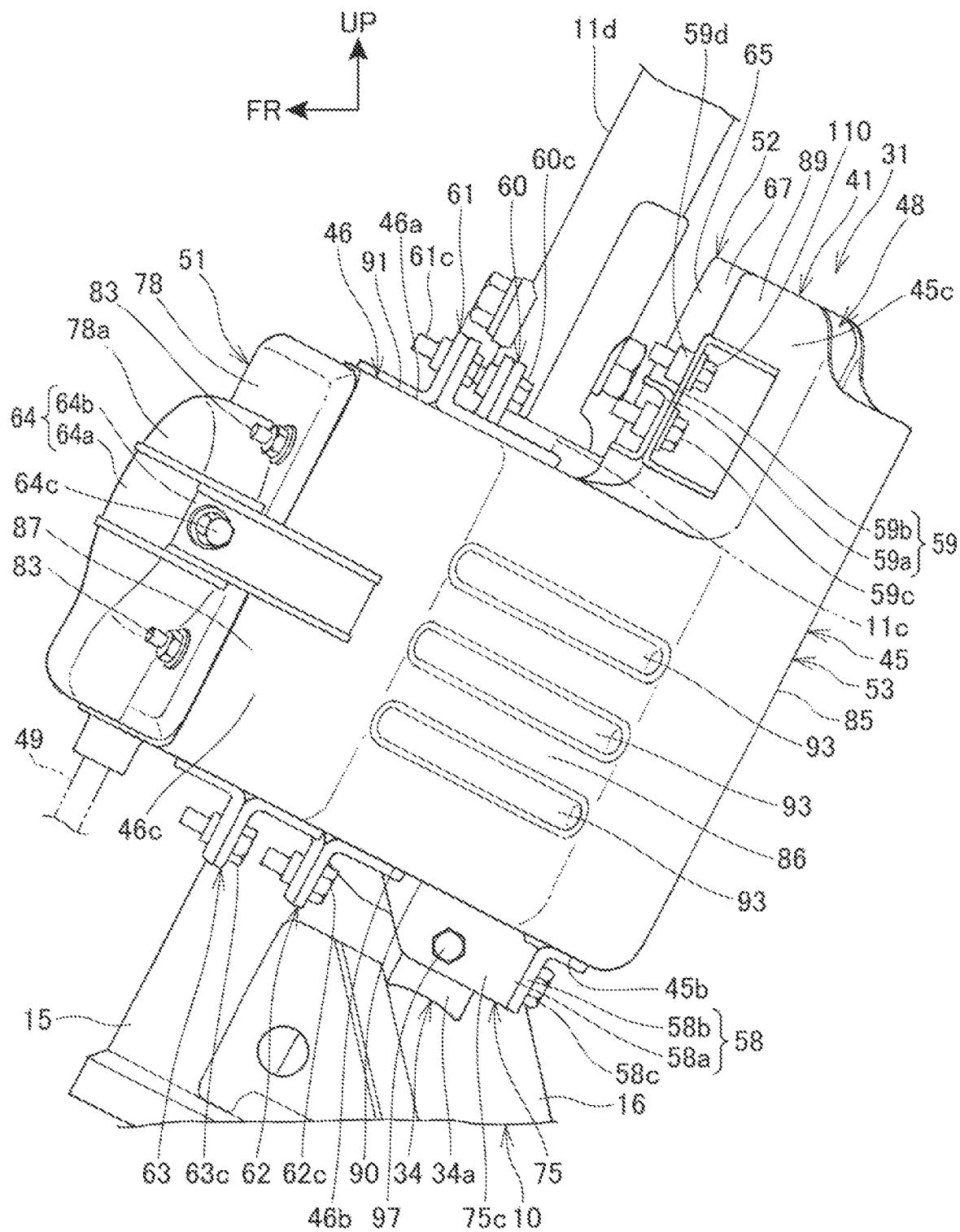
FIG. 13 is a left side view of the retainer attached to the vehicle body frame.
Figure 14:
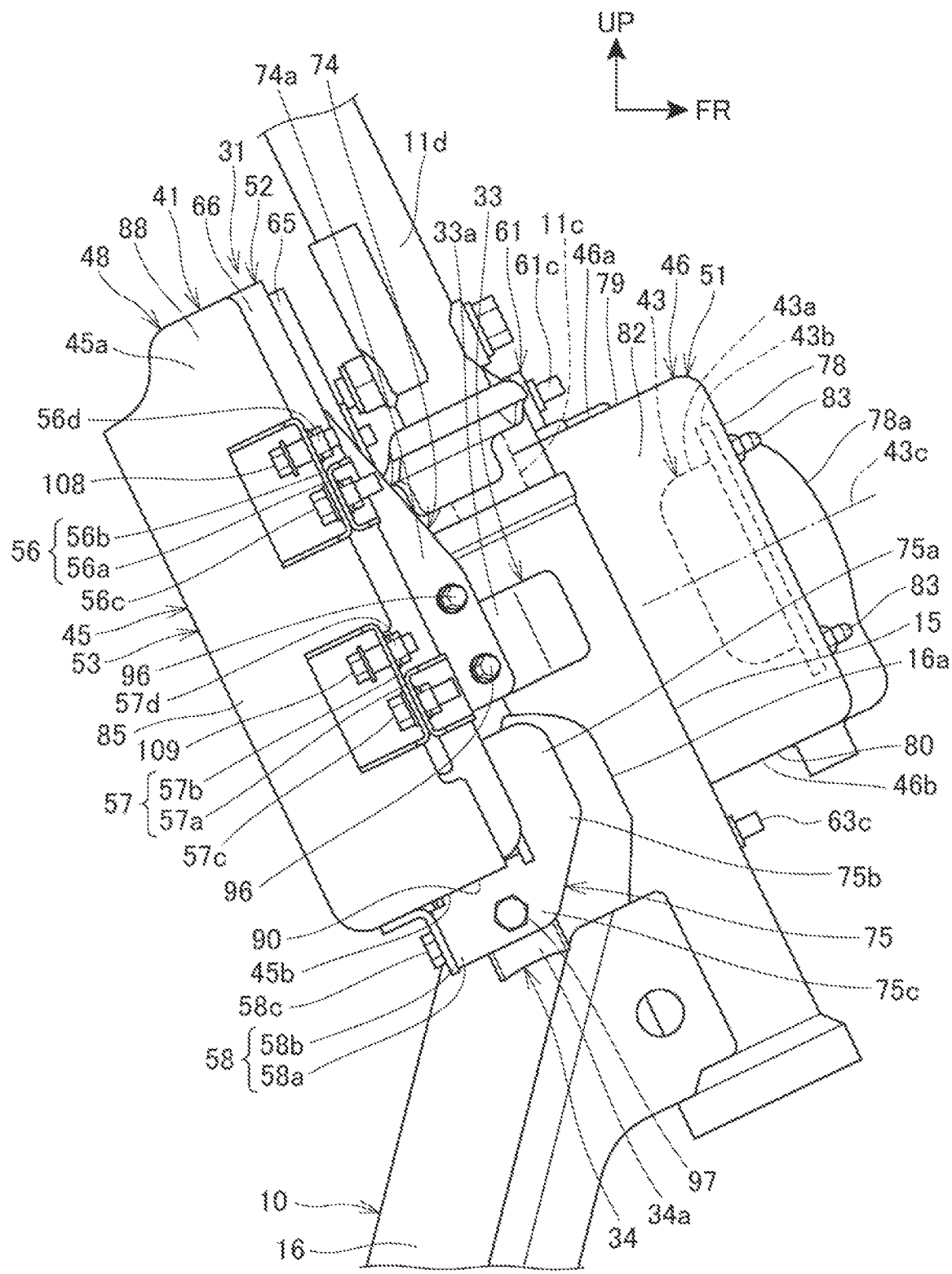
FIG. 14 is a right side view of the retainer attached to the vehicle body frame.
Figure 15:
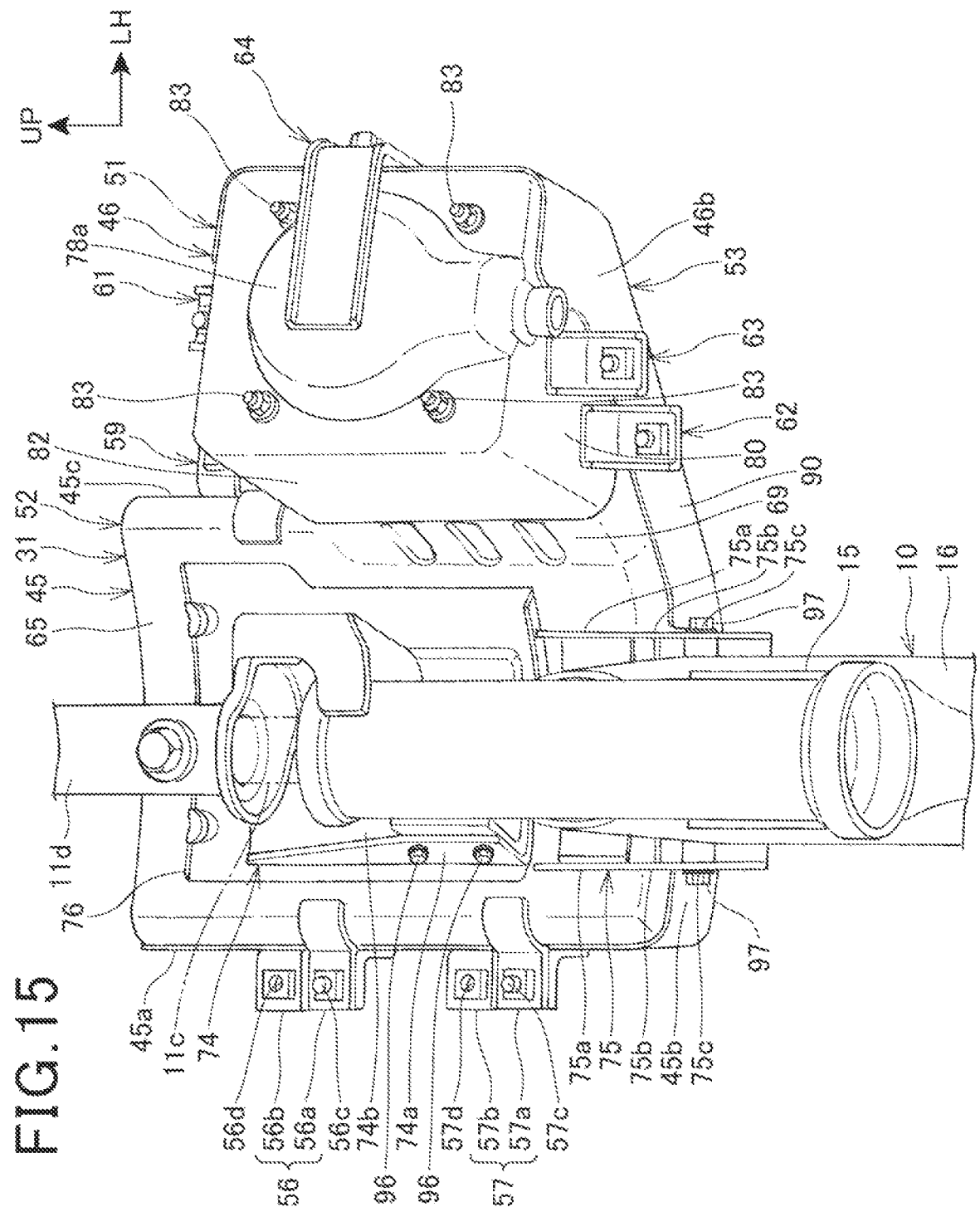
FIG. 15 is a front view of the retainer attached to the vehicle body frame when seen from the front side.

FIG. 13 is a left side view of the retainer 41 attached to the vehicle body frame 10. FIG. 14 is a right side view of the retainer 41 attached to the vehicle body frame 10. FIG. 15 is a front view of the retainer 41 attached to the vehicle body frame 10 when seen from the front side.

Referring to FIGS. 6, 9, and 13 to 15, the retainer 41 is fastened to the stay 32 of the vehicle body frame 10 by the first fastening member 74 and the second fastening member 75 provided in the front surface of the front wall portion 65 of the second component 52.

The first fastening member 74 is fastened to the first stay 33 of the head pipe 15.

More specifically, the first fastening member 74 is provided such that the left and right securing plate portions 74a overlap the left and right first attachment portions 33a of the first stay 33 from the outer side in the vehicle width direction and is fastened to the first stay 33 with a securing tool 96 inserted into the securing hole portion 74c and the securing hole portion 33c from the outer side in the vehicle width direction.

The second fastening member 75 is fastened to the second stay 34 of the down frame 16.

More specifically, the second fastening member 75 is provided such that the left and right backward extending portions 75c overlap the left and right second attachment portions 34a of the second stay 34 from the outer side in the vehicle width direction and is fastened to the second stay 34 with a pair of left and right securing tools 97 inserted into the securing hole portion 75e and the securing hole portion 34c from the outer side in the vehicle width direction.

Since the first fastening member 74 is fastened to the first stay 33 of the head pipe 15, and the second fastening member 75 is fastened to the second stay 34 of the down frame 16 in this manner, it is possible to dispose the retainer 41 on the front side near the head pipe 15 and the down frame 16 and to compactly dispose the retainer 41 in the vehicle front-back direction. Also, it is possible to firmly secure the retainer 41 to the vehicle body frame 10 by the first fastening member 74 and the second fastening member 75 separated from each other in the up-down direction.

The left and right second attachment portions 34a of the second stay 34 are provided in the outer side surfaces of the down frame 16, and the left and right backward extending portions 75c of the second fastening member 75 and the securing tool 97 overlap the outer side surfaces of the down frame 16 from the outer side in the vehicle width direction. The backward extending portions 75c are overlapping portions that overlap the outer side surfaces of the down frame 16 from the outer side in the vehicle width direction. Therefore, it is possible to fasten the second fastening member 75 to the second stay 34 at a position on the vehicle front side and also to dispose the retainer 41 near the vehicle front side as compared with a configuration in which the securing tool 97 is fastened behind the down frame 16, for example.

The second stay 34 integrally includes the third securing piece 58a for fastening the third component 53 to the second component 52. Therefore, it is possible to fasten the third component 53 to the second component 52 with a simple structure by using the second stay 34.

The back portion of the upper end portion of the down frame 16 is located inside the recessed portion 71 (FIG. 9) at the lower end portion of the retainer 41. Therefore, it is possible to dispose the lower end portion of the retainer 41 in the proximity to the down frame 16 and to compactly dispose the retainer 41.

Also, the lower end portion of the retainer 41 is fastened to the second stay 34 via the left and right backward extending portions 75c located outside the recessed portion 71 on the left and right sides. In this manner, it is possible to firmly secure the part in the proximity of the recessed portion 71 to the second stay 34, and even in a case in which the recessed portion 71 is disposed near the down frame 16, a clearance between the recessed portion 71 and the down frame 16 can be secured.

The first fastening member 74 is disposed to be inclined along the back surface of the head pipe 15 below the handle post 11d that is disposed with an inclination to the back upper side in a vehicle side view. Therefore, it is possible to dispose the first fastening member 74 near the head pipe 15 in the vehicle front-back direction.

Referring to FIGS. 8 and 13 to 15, the upward/downward extending portion 45 of the retainer 41 is located immediately behind the head pipe 15 and is located at the center in the vehicle width direction. The sideward extending portion 46 of the retainer 41 extends outward in the vehicle width direction and forward from the upward/downward extending portion 45. The first component 51 constituting the front end portion of the sideward extending portion 46 is located outward in the vehicle width direction relative to the head pipe 15 and is located further forward than the head pipe 15 in a vehicle side view as illustrated in FIG. 14.

The inflator 43 accommodated in the first component 51 is also located outward in the vehicle width direction relative to the head pipe 15 and is located further forward than the head pipe 15 in a vehicle side view.

Since the sideward extending portion 46 of the retainer 41 is disposed outward and forward relative to the head pipe 15 in the airbag unit 31, it is possible to dispose the inflator 43 and the airbag 42 by using a space on the outer side and the front side of the head pipe 15. It is thus possible to reduce the size of the retainer 41 in the vehicle front-back direction and to reduce the protrusion of the retainer 41 on the side of the passenger.

Also, the first fastening member 74 and the second fastening member 75 of the retainer 41 are offset inward in the vehicle width direction relative to the inflator 43. Therefore, it is possible to compactly dispose the first fastening member 74 and the second fastening member 75 by using the space on the inner side of the inflator 43 in the vehicle width direction.

Figure 16:
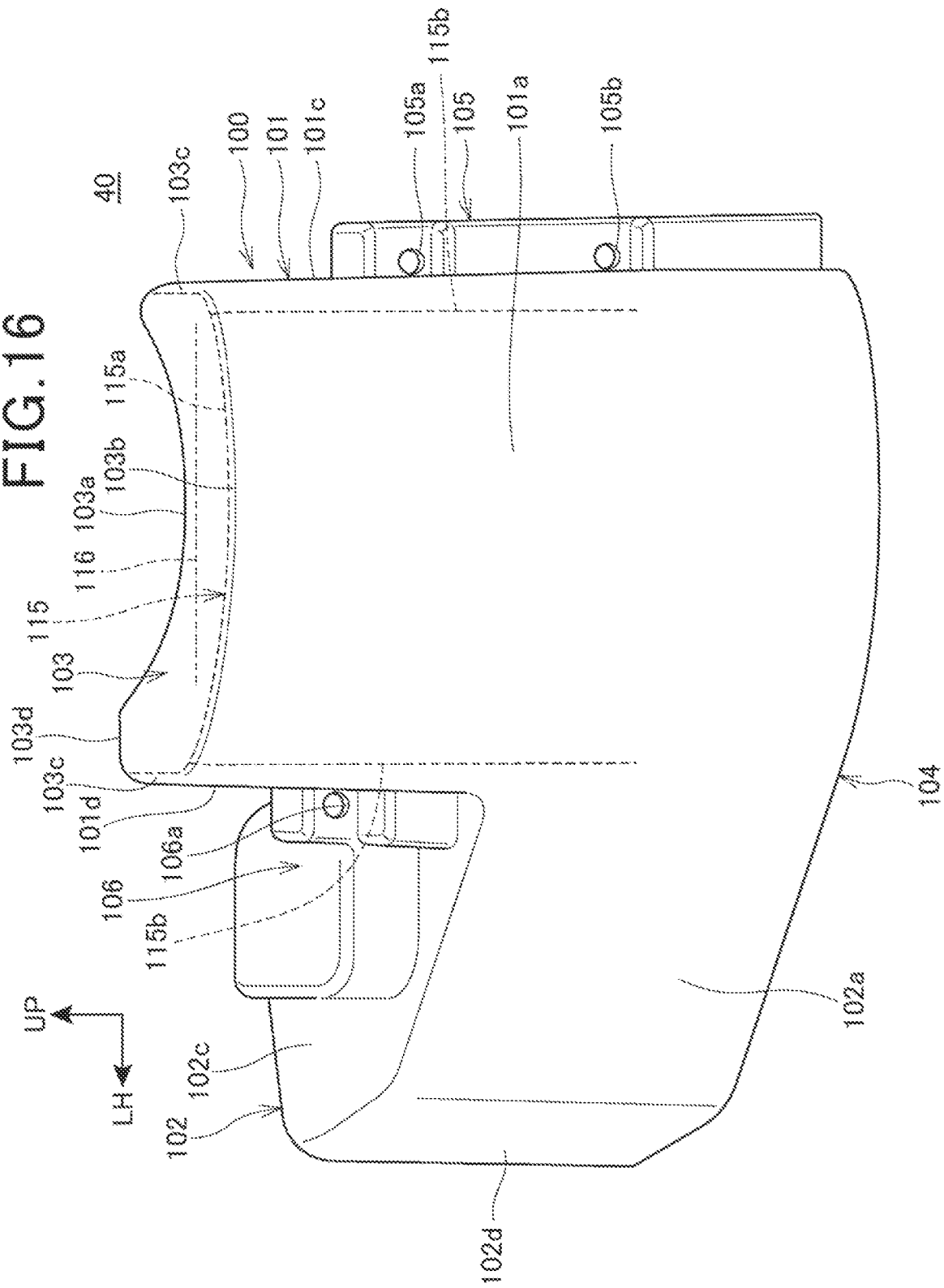
FIG. 16 is a view of the exterior member when seen from the back side.
Figure 17:
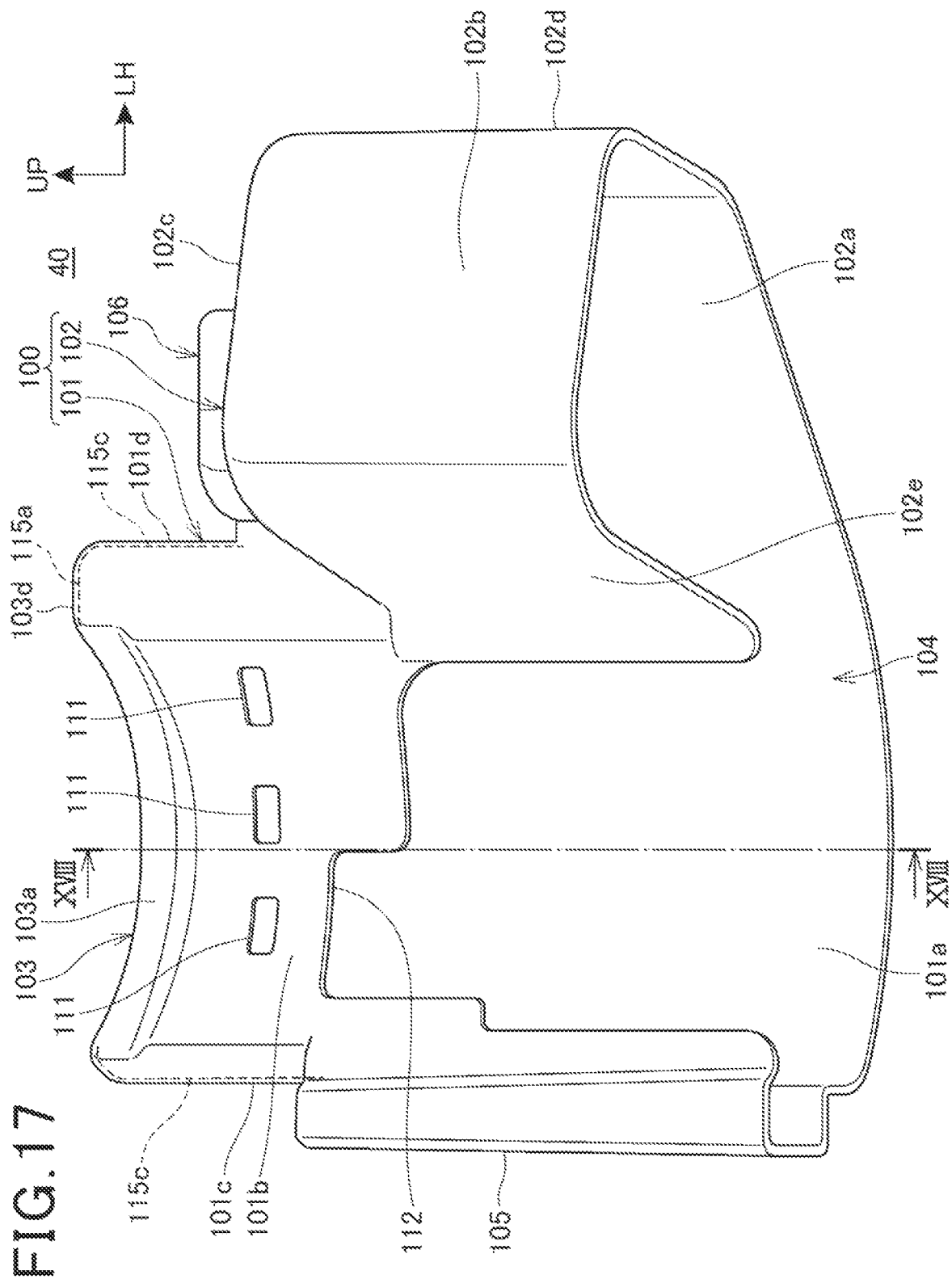
FIG. 17 is a view of the exterior member when seen from the front side.
Figure 18:
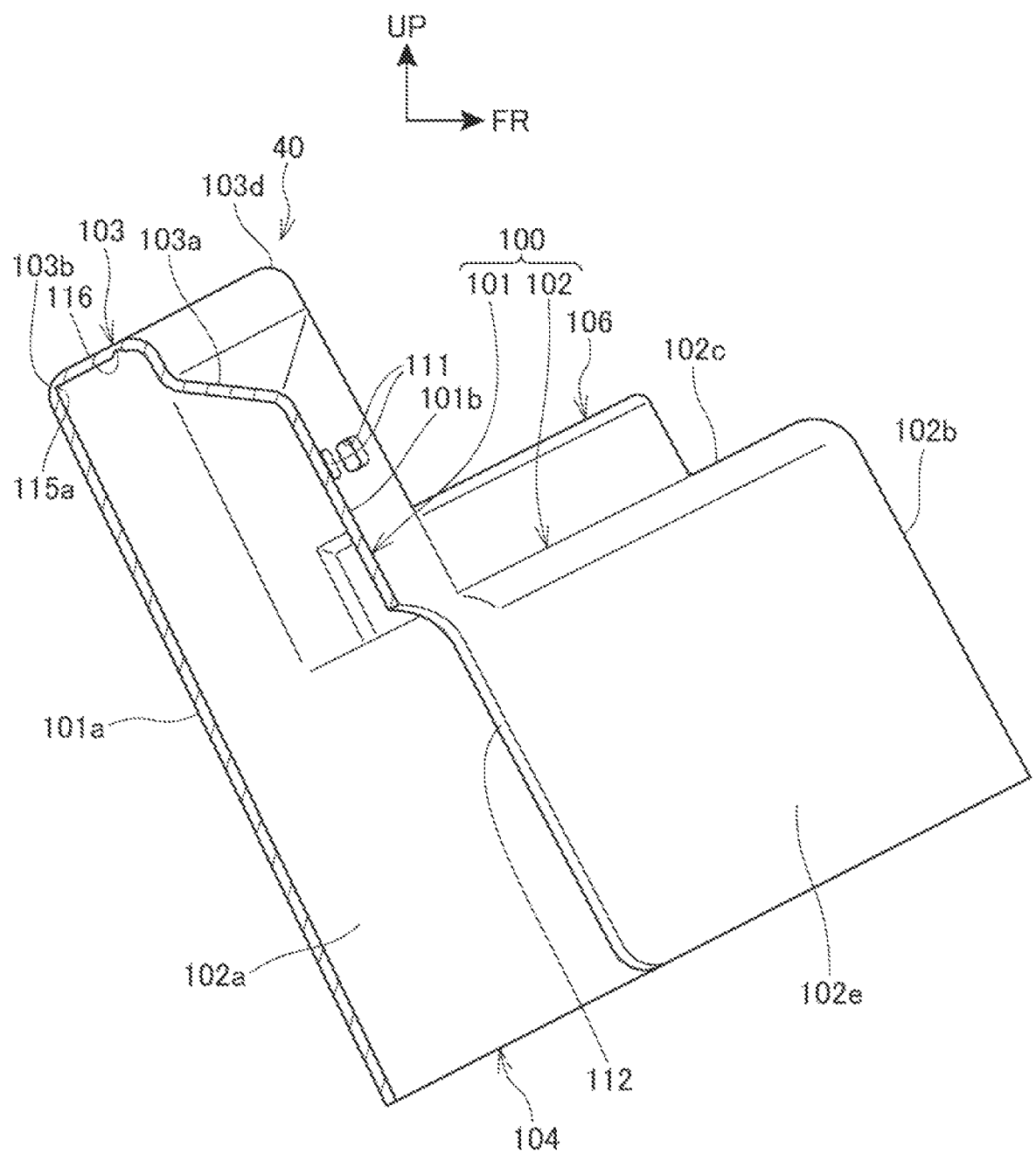
FIG. 18 is a sectional view along XVIII-XVIII in FIG. 17.
Figure 19:
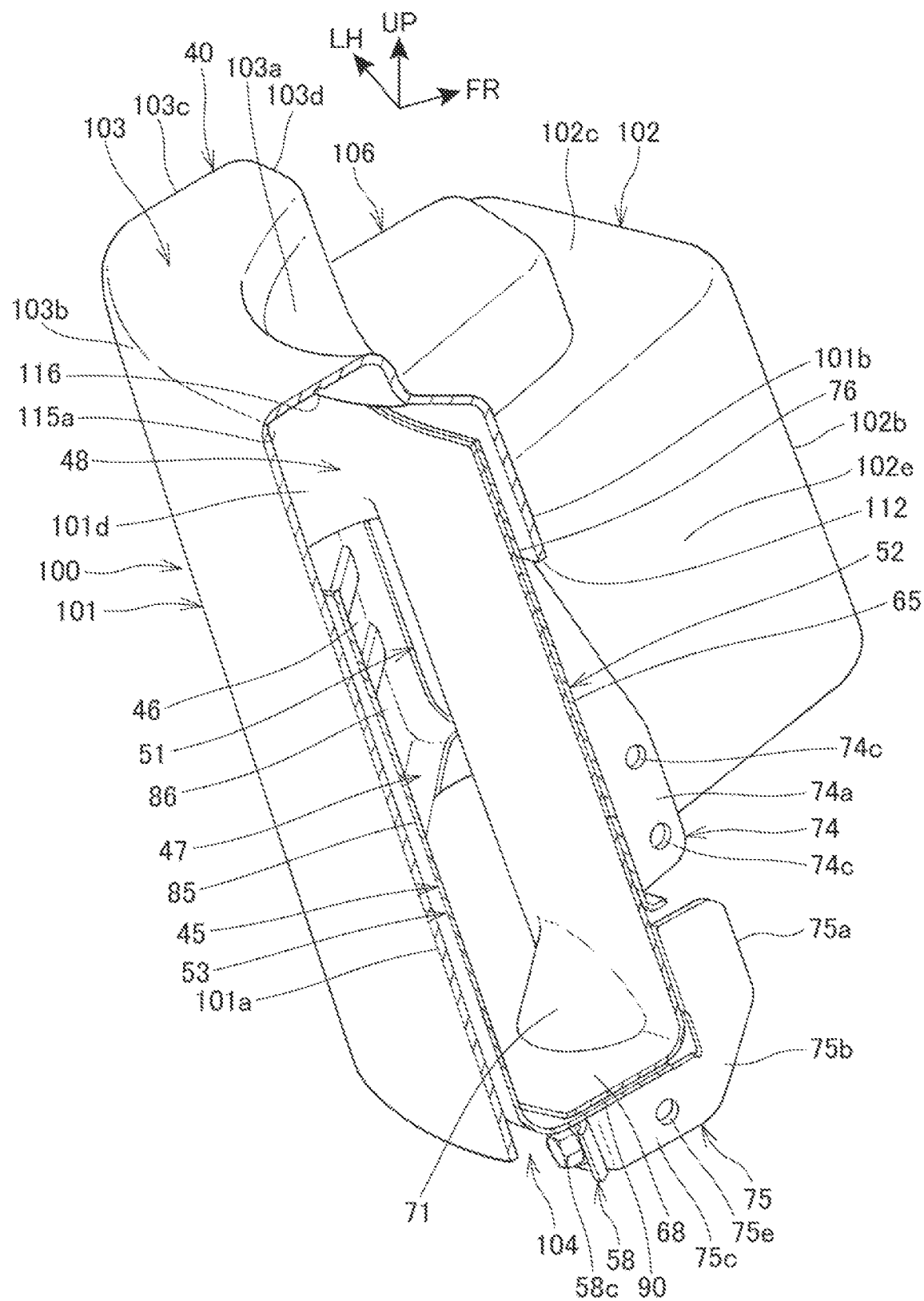
FIG. 19 is a sectional view along XIX-XIX in FIG. 4.

FIG. 16 is a view of the exterior member 40 when seen from the back side (the side of the passenger). FIG. 17 is a view of the exterior member 40 when seen from the front side. FIG. 18 is a sectional view along XVIII-XVIII in FIG. 17. FIG. 19 is a sectional view along XIX-XIX in FIG. 4. In FIG. 19, the airbag 42 is not illustrated.

Referring to FIGS. 4, 5, 8, 11, and 16 to 19, the exterior member 40 is formed to cover substantially the entire surface of the retainer 41 except for the lower surface of the retainer 41.

The exterior member 40 integrally includes a cover 100 that covers the retainer 41 from the surroundings and a lid portion 103 (lid) that covers the opening 48 in the upper surface of the retainer 41 from the upper side.

The cover 100 is provided below the lid portion 103.

The cover 100 integrally includes an upward/downward extending portion cover portion 101 that covers the upward/downward extending portion 45 from the surroundings and a sideward extending portion cover portion 102 that covers the sideward extending portion 46.

A lower-side opening portion 104 that opens a space inside the cover 100 downward is formed in the lower surface of the cover 100. The lower-side opening portion 104 is provided over the entire lower surface of the exterior member 40. The exterior member 40 is attached to the retainer 41 by being placed over the retainer 41 from the upper side via the lower-side opening portion 104.

More specifically, the upward/downward extending portion cover portion 101 includes a back surface portion 101a that covers the upward/downward extending portion 45 from the back side, a front surface portion 101b that covers the upward/downward extending portion 45 from the front side, a one-side side surface portion 101c that covers the side surface of the upward/downward extending portion 45 on the opposite side of the sideward extending portion 46, and an other-side side surface portion 101d that covers a side surface of the upward/downward extending portion 45 on the side of the sideward extending portion 46.

The back surface portion 101a covers the back wall portion 85 of the third component 53. The front surface portion 101b covers the front wall portion 65 of the second component 52. The one-side side surface portion 101c covers the side surface 45a. The other-side side surface portion 101d covers the side surface 45c.

The sideward extending portion cover portion 102 includes a side portion back surface portion 102a that covers the sideward extending portion 46 from the back side, a side portion front surface portion 102b that covers the sideward extending portion 46 from the front side, a side portion upper surface portion 102c that covers the sideward extending portion 46 from the upper side, an outer side surface portion 102d that covers the sideward extending portion 46 from the outer side in the vehicle width direction, and an inner side surface portion 102e that covers the sideward extending portion 46 from the inner side in the vehicle width direction.

The side portion back surface portion 102a covers the side portion back wall portion 86 of the third component 53. The side portion front surface portion 102b covers the wall portion 78 of the first component 51. The side portion upper surface portion 102c covers the upper surface 46a of the sideward extending portion 46. The outer side surface portion 102d covers the outer side surface 46c. The inner side surface portion 102e covers the inner-side side wall portion 82 of the first component 51.

The one-side side surface portion 101c of the upward/downward extending portion cover portion 101 is provided with a securing portion accommodating portion 105 obtained by causing a part of the one-side side surface portion 101c to expand outward in the vehicle width direction.

The first securing portion 56 and the second securing portion 57 are accommodated in the securing portion accommodating portion 105.

An upper portion of a front surface of the securing portion accommodating portion 105 is provided with a first attachment hole 105a penetrating through the front surface.

A second attachment hole 105b penetrating through the front surface of the securing portion accommodating portion 105 is provided below the first attachment hole 105a in the front surface of the securing portion accommodating portion 105.

The side portion upper surface portion 102c of the sideward extending portion cover portion 102 is provided with a securing portion accommodating portion 106 obtained by causing a part of the side portion upper surface portion 102c to expand upward.

The fourth securing portion 59, the fifth securing portion 60, and the sixth securing portion 61 are accommodated in the securing portion accommodating portion 106.

A front surface of the securing portion accommodating portion 106 is provided with a third attachment hole 106a penetrating through the front surface.

Referring to FIGS. 4, 8, 9 and 16, the exterior member 40 is fastened to the retainer 41 by a cover fastening tool 108 inserted into the first attachment hole 105a and fastened to the first cover securing hole portion 56d, a cover fastening tool 109 inserted into the second attachment hole 105b and fastened to the second cover securing hole portion 57d, and a cover fastening tool 110 inserted into the third attachment hole 106a and fastened to the third cover securing hole portion 59d.

Here, referring to FIG. 8, the first securing piece 56b where the first cover securing hole portion 56d is provided is a securing piece into which the fastening tool 56c for fastening the third component 53 and the front-side case 55 is inserted.

Also, the second securing piece 57b where the second cover securing hole portion 57d is provided is a securing piece into which the fastening tool 57c for fastening the third component 53 and the front-side case 55 is inserted.

Moreover, the fourth securing piece 59b where the third cover securing hole portion 59d is provided is a securing piece into which the fastening tool 59c for fastening the third component 53 and the front-side case 55 is inserted.

Therefore, it is possible to secure the exterior member 40 to the retainer 41 with a simple structure by using the securing pieces for fastening the third component 53 and the front-side case 55.

Referring to FIGS. 17 and 18, a plurality of engagement holes 111 with which the engagement portions 76a (FIG. 9) of the retainer 41 are engaged are provided to be aligned in the vehicle width direction at the upper portion of the front surface portion 101b of the upward/downward extending portion cover portion 101. The exterior member 40 is secured to the retainer 41 by the engagement portions 76a as well.

A notch portion 112 that avoids the first fastening member 74 and the second fastening member 75 projecting forward from the retainer 41 are provided below the engagement holes 111 in the front surface portion 101b of the upward/downward extending portion cover portion 101.

Referring to FIG. 3, the upper end portion of the handle post 11d is provided with a handle holder 11f that supports the handle 11e. The handle holder 11f has a disc shape in a plan view from the upper side, and the handle 11e is secured to an upper surface of the handle holder 11f.

The airbag unit 31 is disposed such that the lid portion 103 of the exterior member 40 is aligned behind the handle holder 11f.

The lid portion 103, the back surface portion 101a, the side portion back surface portion 102a, the securing portion accommodating portion 105 and the securing portion accommodating portion 106 of the exterior member 40 are exposed to the straddling space 27.

Referring to FIGS. 3 and 16 to 19, a lid recessed portion 103a recessed downward to avoid the back portion of the handle holder 11f is provided at the front portion of the lid portion 103. A back edge of the lid recessed portion 103a is formed into an arc shape in accordance with the shape of the back portion of the handle holder 11f.

The back portion of the handle holder 11f is disposed in the lid recessed portion 103a. It is thus possible to dispose the lid portion 103 near the handle holder 11f in the vehicle front-back direction.

Referring to FIGS. 16 to 18, the exterior member 40 includes a tear line 115 and a hinge portion 116 as a ripping portion that is caused to rupture due to the deployed airbag 42.

The tear line 115 and the hinge portion 116 are a groove-shaped brittle portion formed to have a thin plate thickness as compared to the plate thickness of the exterior member 40 at the part around the tear line 115 and the hinge portion 116.

The tear line 115 is formed to have a thinner plate thickness than the plate thickness of the hinge portion 116 and rupture with higher priority than the hinge portion 116.

Although the hinge portion 116 may rupture, the exterior member 40 is deformed starting from the hinge portion 116.

The tear line 115 includes a lid-side tear line 115a provided at a part except for the part corresponding to the lid recessed portion 103a at a front edge 103b of the lid portion 103, both left and right side edges 103c of the lid portion 103, and a back edge 103d of the lid portion 103.

Also, the tear line 115 includes a pair of left and right back-side tear lines 115b extending downward along the left and right side edges of the back surface portion 101a from parts corresponding to left and right end portions of the front edge 103b in the lid-side tear line 115a and a pair of left and right front-side tear lines 115c extending downward along the left and right side edges of the front surface portion 101b from parts corresponding to left and right end portions of the back edge 103d in the lid-side tear line 115a.

The back-side tear line 115b extends from the lid portion 103 to the lower portion of the upward/downward extending portion cover portion 101, and a lower end of the back-side tear line 115b is located further downward than the side portion upper surface portion 102c.

The front-side tear line 115c extends from the lid portion 103 to the upper portion of the upward/downward extending portion cover portion 101, and a lower end of the front-side tear line 115c is located further upward than the side portion upper surface portion 102c.

The hinge portion 116 linearly extends in the vehicle width direction between the front edge 103b and the lid recessed portion 103a in the upper surface of the lid portion 103.

The exterior member 40 covers a range from the upper end portion to the lower end portion of the retainer 41 and covers substantially the entire retainer 41 except for the lower surface of the retainer 41 and the notch portion 112 from the outer side. Here the upper end portion of the retainer 41 is the opening 48, and the lower end portion of the retainer 41 is lower edges of the back wall portion 85 and the side portion back wall portion 86.

Therefore, it is possible to cover the retainer 41 entirely from the upper side and the surroundings with the exterior member 40 and to improve water proofness of the retainer 41.

The exterior member 40 integrally includes the lid portion 103 that covers the opening 48 and the cover 100 that covers the retainer 41 from the surrounding and thus has high water proofness. In a case in which the lid portion 103 and the cover 100 are provided as separate components, for example, water is likely to enter a gap between the lid portion 103 and the cover 100.

Also, the sideward extending portion cover portion 102 of the exterior member 40 covers the first component 51 that accommodates the inflator 43 from the upper side, the lateral side, and the front side. Therefore, even in a case in which the inflator 43 is disposed to be offset outward in the vehicle width direction relative to the lid portion 103 that covers the opening 48, it is possible to secure water proofness of the inflator 43.

Referring to FIGS. 4, 8, 11, and 16, the inflator 43 injects gas into the airbag 42 toward the vehicle back side along the axial line 43c under control of the airbag control device.

The path of the gas released from the inflator 43 to the inside of the airbag 42 is guided by the sideward extending portion 46 and the upward/downward extending portion 45, and the gas flows in the L shape inside the airbag passage 47.

At this time, a part of the gas injected from the inflator 43 comes into contact with the guide portion 94 of the sideward extending portion 46 via the airbag 42 and flows inward in the vehicle width direction along the guide portion 94.

If the gas flows from the sideward extending portion 46 to the upward/downward extending portion 45, then the flow in the left-right direction changes to a flow in the upward direction, and the gas flows upward inside the upward/downward extending portion 45.

If the airbag 42 is expanded upward by the gas flowing upward inside the upward/downward extending portion 45, then the exterior member 40 rips starting at the parts corresponding to the tear line 115 and the hinge portion 116, the lid portion 103 is opened, and the opening 48 is then exposed. Then, the airbag 42 is deployed upward as illustrated in FIG. 1 from the opening 48 by the gas flowing upward.

Also, the retainer 41 is fastened to the down frame 16 at a position on the lower side of the retainer 41 via the second fastening member 75. In this manner, support rigidity of the lower portion of the retainer 41 with respect to the side of the vehicle body frame 10 is enhanced. When the airbag 42 is expanded by the gas, the part of the upper portion of the retainer 41 on the side of the opening 48 slightly moves to the side of the passenger with the part corresponding to the second fastening member 75 as a support point due to the expansion of the airbag 42 and is deformed to widen the opening 48. Therefore, it is possible to satisfactorily deploy the airbag 42 upward.

Moreover, the retainer 41 is supported by the vehicle body frame 10 at a plurality of locations by the first fastening member 74 and the second fastening member 75. Therefore, even if the retainer 41 has an L shape with a large size in the vehicle width direction, it is possible to satisfactorily support the retainer 41.

As described above, according to the first embodiment to which the present invention is applied, the airbag device 30 for the motorcycle 1 includes: the retainer 41 provided in front of the seat 13 for the passenger; the inflator 43; the airbag 42 that is accommodated in the retainer 41, is expanded by the gas released by the inflator 43, and deployed upward from the opening 48 in the upper surface of the retainer 41; and the lid portion 103 that blocks the opening 48, and the cover 100 that covers the retainer 41 from the outer side is provided below the lid portion 103.

With this configuration, it is possible to curb invasion of water into the retainer 41 with the cover 100 that covers the retainer 41 from the outer side below the lid portion 103 and to improve water proofness with a simple structure.

Also, the retainer 41 includes the first component 51 as the inflator accommodating portion that accommodates the inflator 43, and the cover 100 covers the first component 51.

With this configuration, it is possible to improve water proofness of the first component 51 that is the inflator accommodating portion with the cover 100 and to curb adhesion of water to the inflator 43.

Also, the lid portion 103 is formed integrally with the cover 100.

With this configuration, the lid portion 103 and the cover 100 are integrated, and it is thus possible to improve water proofness and to reduce the number of components.

Moreover, the cover 100 includes the tear line 115 as the ripping portion that is caused to rapture by the deployed airbag 42.

With this configuration, the cover 100 rips by means of the tear line 115, and it is thus possible to satisfactorily deploy the airbag 42 even in a case in which the water proofness is improved by the cover 100.

Also, the lid portion 103 includes the lid-side tear line 115a of the tear line 115 and the hinge portion 116 as the ripping portion that is caused to rapture by the deployed airbag 42.

With this configuration, the lid portion 103 rips by means of the lid-side tear line 115a and the hinge portion 116, and it is thus possible to satisfactorily deploy the airbag 42 even in a case in which water proofness is improved by the cover 100.

Also, the cover 100 covers the range from the upper end portion to the lower end portion of the retainer 41.

With this configuration, the cover 100 covers the range from the upper end portion to the lower end portion of the retainer 41, and high water proofness is thus achieved.

Also, the lower surface of the cover 100 is provided with the lower-side opening portion 104 opened downward such that the retainer 41 can be accommodated in the cover 100 from the lower-side opening portion 104.

With this configuration, it is possible to easily assemble the cover 100 with the retainer 41 via the lower-side opening portion 104.

Also, the cover 100 is fastened to the retainer 41.

With this configuration, it is possible to secure the cover 100 to the retainer 41 with a simple structure.

In addition, the retainer 41 is formed into an L shape including the upward/downward extending portion 45 extending in the up-down direction and the sideward extending portion 46 extending outward in the vehicle width direction from the upward/downward extending portion 45, the opening 48 is provided in the upper surface of the upward/downward extending portion 45, and the cover 100 covers the first component 51 as the inflator accommodating portion provided at the sideward extending portion 46.

With this configuration, it is possible to improve, with the cover 100, water proofness of the first component 51 as the inflator accommodating portion provided at the sideward extending portion 46 in the retainer 41 in the L shape with the opening 48 provided in the upper surface of the upward/downward extending portion 45.

Also, according to the first embodiment to which the present invention is applied, the airbag device 30 for the motorcycle 1 includes: the retainer 41 provided behind the head pipe 15; the inflator 43; and the airbag 42 accommodated in the retainer 41, the airbag being configured to be expanded by the gas released by the inflator 43 and deployed in front of the passenger, the retainer 41 has a box shape formed by assembling the plurality of components, the inflator 43 is disposed to be offset outward in the vehicle width direction relative to the head pipe 15, the first component 51 covers the inflator 43 from the vehicle front side, the second component 52 is provided behind the head pipe 15, and the third component 53 is provided on the side of the passenger and is fitted to the second component 52 and the first component 51 from the back side.

With this configuration, in a case in which the inflator 43 is disposed to be offset outward in the vehicle width direction relative to the head pipe 15, the retainer 41 is formed by assembling the first component 51 that covers the inflator 43 from the vehicle front side, the second component 52 that is provided behind the head pipe 15, and the third component 53 that is provided on the side of the passenger and is fitted to the second component 52 and the first component 51 from the back side. Therefore, it is possible to reduce the size of each mold for manufacturing the first component 51, the second component 52, and the third component 53 and to easily manufacture the retainer 41. In particular, it is possible to easily form the first component 51 that tends to have a complicated shape by individually forming the first component 51 that is disposed to be offset outward in the vehicle width direction relative to the head pipe 15 and covers the inflator 43 in the vehicle front-back direction.

Also, the weld-securing portion 51b and the fifth securing portion 60, the sixth securing portion 61, the seventh securing portion 62, the eighth securing portion 63, and the ninth securing portion 64 which are secured locations of the first component 51 with respect to the second component 52 and the third component 53 are around the inflator 43.

With this configuration, the secured locations of the first component 51 with respect to the second component 52 and the third component 53 are gathered around the inflator 43, and it is thus possible to easily secure the secured locations of the first component 51 and to effectively receive a gas injection pressure of the inflator 43 by the secured locations.

Also, the second component 52 is provided with the fastening portion 73 that secures the retainer 41 to the vehicle body frame 10.

With this configuration, the second component 52 provided behind the head pipe 15 is provided with the fastening portion 73, and it is thus possible to secure the retainer 41 to the vehicle body frame 10 with a simple structure.

Moreover, the third component 53 is provided with the guide portion 94 that guides the flow of the gas inward in the vehicle width direction with the stepped shape 93 inside the retainer 41.

With this configuration, it is possible to cause the gas from the inflator 43 offset outward in the vehicle width direction to flow inward in the vehicle width direction by the guide portion 94 and to efficiently deploy the airbag 42.

Also, the first component 51 includes the wall portion 78 as the inflator support portion that supports the inflator 43, the first component 51 and the second component 52 are joined to form the front-side case 55, and the third component 53 is joined to the front-side case 55.

With this configuration, the first component 51 including the wall portion 78 as the inflator support portion is individually constituted, and it is thus possible to easily form the first component 51 that tends to have a complicated shape. Also, the third component 53 is joined to the front-side case 55 in which the first component 51 and the second component 52 are joined to each other, and it is thus possible to easily form the retainer 41 into a box shape.

Also, the retainer 41 has an L shape including the upward/downward extending portion 45 extending in the up-down direction and having the upper end portion from which the airbag is deployed and the sideward extending portion 46 extending outward in the vehicle width direction from the upward/downward extending portion 45, and the front-side case 55 in the L shape and the third component 53 in the L shape are joined to each other.

With this configuration, it is possible to easily manufacture the retainer 41 in the L shape by joining the front-side case 55 in the L shape and the third component 53 in the L shape.

Also, the first component 51 and the second component 52 are joined through welding, and the third component 53 is detachably fastened to the front-side case 55.

With this configuration, it is possible to achieve satisfactory strength of the front-side case 55 through the welding between the first component 51 and the second component 52. Also, the third component 53 can be attached to and detached from the front-side case 55, which contributes to an improvement in an assembling property of the airbag device 30.

Also, the inflator 43 is disposed in an orientation such that the axial line 43c of the inflator 43 is directed in the vehicle front-back direction, the first component 51 supports the inflator 43 with the inflator 43 covered from the front side and is joined to the second component 52, and the third component 53 is fitted to the first component 51 and the second component 52 from the back side.

With this configuration, it is possible to satisfactorily support the inflator 43 disposed in the orientation such that the axial line 43c is directed in the vehicle front-back direction by the first component 51 that covers the inflator 43 from the front side. Also, it is possible to easily form the retainer 41 into a box shape by fitting the third component 53 to the first component 51 and the second component 52 from the back side.

Also, the inflator 43 is supported by the first component 51, and at least a part of the first component 51 is provided at the position in front of the head pipe 15 and outward in the vehicle width direction.

With this configuration, it is possible to compactly dispose the first component 51 that supports the inflator 43 at the position in front of the head pipe 15 and outward in the vehicle width direction. Also, the first component 51 provided in front of the second component 52 disposed behind the head pipe 15 is individually formed with respect to the second component 52, and it is thus possible to easily manufacture the retainer 41 even in a case in which the retainer 41 is formed into a complicated shape.

Further, according to the first embodiment to which the present invention is applied, the motorcycle 1 includes: the vehicle body frame 10 including the head pipe 15 that supports the steering system 11 and the down frame 16 that extends downward from the head pipe 15; the retainer 41 provided behind the head pipe 15; the inflator 43; and the airbag 42 accommodated in the retainer 41, the airbag being configured to be expanded by the gas released by the inflator 43 and deployed in front of the passenger, the retainer 41 is provided with the fastening portion 73 that fastens the retainer 41 to the vehicle body frame 10, the fastening portion 73 includes the first fastening member 74 and the second fastening member 75 as the plurality of fastening members.

With this configuration, the retainer 41 is fastened to the vehicle body frame 10 via the first fastening member 74 and the second fastening member 75, and it is thus possible to compactly form the first fastening member 74 and the second fastening member 75, to bring the retainer 41 close to the vehicle front side, and to improve an occupant comfort of the passenger.

Also, the plurality of fastening members include the first fastening member 74 fastened to the head pipe 15 and the second fastening member 75 fastened to the vehicle body frame 10 below the first fastening member 74.

With this configuration, the first fastening member 74 is fastened to the head pipe 15, the second fastening member 75 is fastened to the vehicle body frame 10 below the first fastening member 74, and it is thus possible to bring the retainer 41 close to the vehicle front side and to improve an occupant comfort of the passenger. In addition, the first fastening member 74 and the second fastening member 75 are separated in the up-down direction, and it is thus possible to enhance support rigidity of the retainer 41.

Also, the second fastening member 75 is fastened to the down frame 16.

With this configuration, the retainer 41 is fastened to the head pipe 15 and the down frame 16 via the first fastening member 74 and the second fastening member 75, and it is thus possible to bring the retainer 41 close to the vehicle front side and to improve an occupant comfort of the passenger.

Also, the first fastening member 74 is provided on a lateral side of the inflator 43.

With this configuration, it is possible to dispose the first fastening member 74 by using a space on the lateral side of the inflator 43 and thereby to improve an occupant comfort of the passenger.

In addition, the inflator 43 is disposed to be offset outward in the vehicle width direction relative to the head pipe 15, and the first fastening member 74 is disposed inward in the vehicle width direction relative to the inflator 43.

With this configuration, it is possible to secure the space around the head pipe 15 by disposing the inflator 43 on the outer side of the head pipe 15 in the vehicle width direction and to improve an occupant comfort of the passenger by disposing the first fastening member 74 at a position near the head pipe 15.

Moreover, the steering system 11 includes the handle post 11d extending upward relative to the head pipe 15 and supporting the handle 11e, and the first fastening member 74 is fastened to the head pipe 15 below the handle post 11d in a vehicle side view.

With this configuration, the first fastening member 74 is fastened to the head pipe 15 below the handle post 11d, and it is thus possible to dispose the first fastening member 74 near the vehicle front side and to improve an occupant comfort of the passenger.

Also, the second fastening member 75 includes the backward extending portions 75c as overlapping portions that overlap the down frame 16 from the outer side in the vehicle width direction, and the backward extending portions 75c are fastened to the down frame 16.

With this configuration, it is possible to dispose the second fastening member 75 near the front side up to a position at which the second fastening member 75 overlaps the down frame 16 on the outer side in the vehicle width direction and thereby to improve an occupant comfort of the passenger.

Also, the down frame 16 extends from the head pipe 15 to the back lower side, the lower portion of the retainer 41 is provided with the recessed portion 71 recessed backward, and a part of the down frame 16 is located in the recessed portion 71.

With this configuration, the part of the down frame 16 is located in the recessed portion 71 at the lower portion of the retainer 41, and it is thus possible to dispose the retainer 41 near the side of the down frame 16 and to improve an occupant comfort of the passenger.

Also, the second fastening member 75 includes the plurality of left and right backward extending portions 75c as the securing portions fastened to the down frame 16, and the recessed portion 71 is provided between the left and right backward extending portions 75c.

With this configuration, the second fastening member 75 secures the retainer 41 with the backward extending portions 75c on the left and right sides of the recessed portion 71, and it is thus possible to firmly secure the retainer 41. Therefore, even in a case in which the recessed portion 71 is disposed near the down frame 16, it is possible to secure the clearance between the recessed portion 71 and the down frame 16 and to dispose the retainer 41 in the proximity of the down frame 16.

Furthermore, the first fastening member 74 and the second fastening member 75 overlap the stay 32 provided at the vehicle body frame 10 in the vehicle width direction and are fastened to the stay 32 with the securing tool 96 and the securing tool 97 inserted in the vehicle width direction.

With this configuration, it is possible to compactly fasten the first fastening member 74 and the second fastening member 75 to the vehicle body frame 10 in the vehicle front-back direction and to improve an occupant comfort of the passenger.

Also, the inflator 43 is accommodated in the retainer 41 at a position in front of the head pipe 15 and outward in the vehicle width direction.

With this configuration, the inflator 43 is accommodated in the retainer 41 at the position in front of the head pipe 15 and outward in the vehicle width direction, and it is thus possible to minimize the backward protrusion of the retainer 41 and to improve an occupant comfort of the passenger.

Note that the aforementioned first embodiment illustrates an aspect to which the present invention is applied, and the present invention is not limited to the aforementioned first embodiment.

Although the aforementioned first embodiment has been described on the assumption that the cover 100 covers the range from the upper end portion to the lower end portion of the retainer 41, the present invention is not limited thereto. For example, the cover 100 may cover a range from the upper end portion of the retainer 41 to at least an intermediate portion of the retainer 41 in the up-down direction. With this configuration, it is possible to achieve effective water proofness against water from the upper side while reducing the size of the cover 100.

Also, although the aforementioned first embodiment has been described on the assumption that the exterior member 40 is fastened to the retainer 41 with the cover fastening tools 108 to 110, the present invention is not limited thereto, and the exterior member 40 may be fastened together with the third component 53 via the fastening tools 56c, 57c, and 59c, for example.

Also, although the aforementioned first embodiment has been described by exemplifying the motorcycle 1 as an example of the saddled vehicle, the present invention is not limited thereto, and the present invention can be applied to a three-wheeled vehicle including two front wheels or rear wheels and saddled vehicles including four or more wheels.

Second Embodiment

Hereinafter, a second embodiment to which the present invention is applied will be described with reference to FIGS. 20 and 21. In the second embodiment, the same reference signs will be applied to components constituted similarly to those in the aforementioned first embodiment, and description will be omitted.

The second embodiment is different from the aforementioned first embodiment in the securing portion that secures the front-side case 55 to the third component 53 through fastening and the shape of the exterior member 240.

Figure 20:
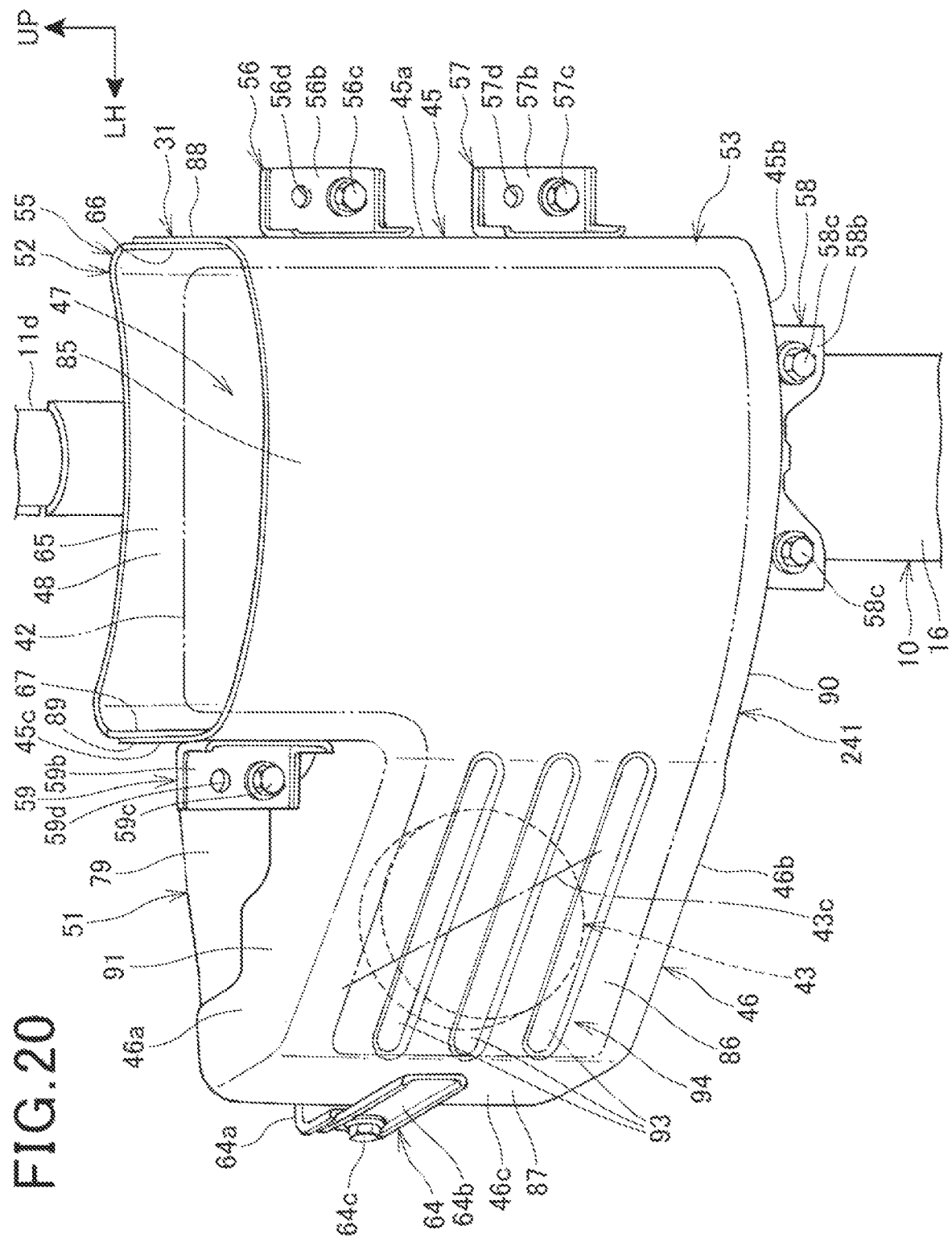
FIG. 20 is a view of a retainer attached to a vehicle body frame when seen from the back side according to a second embodiment.

FIG. 20 is a view of a retainer 241 attached to a vehicle body frame 10 when seen from the back side in the second embodiment.

The retainer 241 does not include the fifth securing portion 60, the sixth securing portion 61, the seventh securing portion 62, and the eighth securing portion 63 in the aforementioned first embodiment. The other structures of the retainer 241 are the same as those of the retainer 41 in the aforementioned first embodiment.

Figure 21:
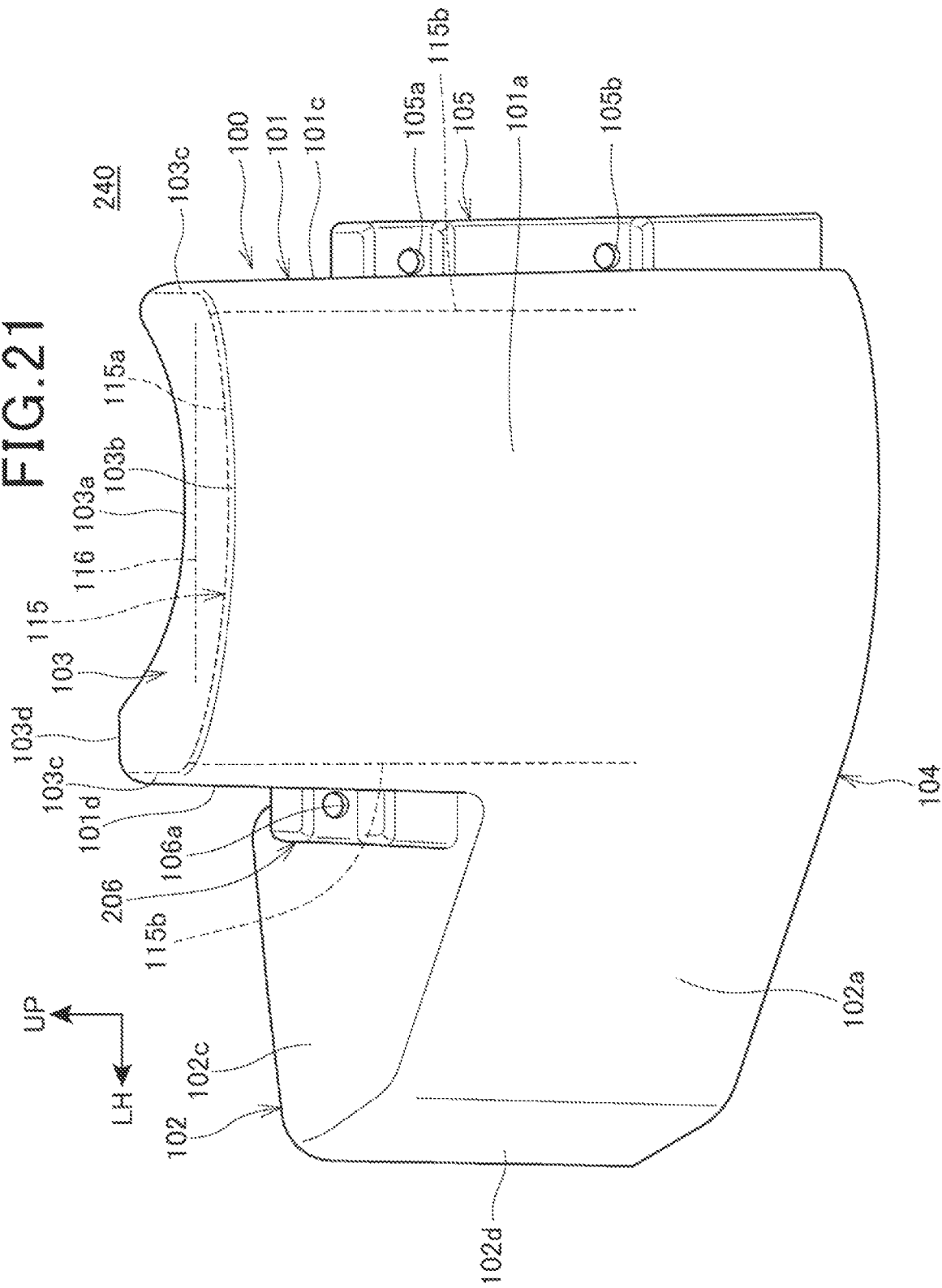
FIG. 21 is a view of an exterior member covering the retainer when seen from the back side.

FIG. 21 is a view of an exterior member 240 that covers the retainer 241 when seen from the back side.

The exterior member 240 includes a securing portion accommodating portion 206 obtained by causing a part of a side portion upper surface portion 102c to expand upward.

The securing portion accommodating portion 206 covers a fourth securing portion 59. In the second embodiment, the fifth securing portion 60 and the sixth securing portion 61 are not provided, and the shape of the securing portion accommodating portion 206 is thus smaller than the shape of the securing portion accommodating portion 106 in the aforementioned first embodiment.

REFERENCE SIGNS LIST

1 Motorcycle (saddled vehicle)
10 Vehicle body frame (vehicle body)
13 Seat
15 Head pipe
30 Airbag device
41 Retainer
42 Airbag
43 Inflator
43c Axial line
45 Upward/downward extending portion
46 Sideward extending portion
51 First component
51b Weld-securing portion (secured location)
52 Second component
53 Third component
55 Front-side case
60 Fifth securing portion (secured location)
61 Sixth securing portion (secured location)
62 Seventh securing portion (secured location)
63 Eighth securing portion (secured location)
64 Ninth securing portion (secured location)
73 Fastening portion
78 Wall portion (inflator support portion)
93 Stepped shape
94 Guide portion

The invention claimed is:

1. An airbag device for a saddled vehicle comprising:
   a retainer provided behind a head pipe;
   an inflator; and
   an airbag accommodated in the retainer, the airbag being configured to be expanded by gas released by the inflator and deployed in front of a passenger,
   wherein the retainer has a box shape formed by assembling a first component, a second component, and a third component,
   the airbag device includes an exterior member that covers, by a lid portion, an opening in an upper surface of the retainer from an upper side and that covers, from an outer side of the retainer, substantially an entirety of the retainer from an upper end portion to a lower end portion of the retainer,
   the inflator is disposed to be offset outward in a vehicle width direction relative to the head pipe,
   the first component covers the inflator from a vehicle front side,
   the second component is provided behind the head pipe,
   the third component is provided on a side of the passenger and is fitted to the second component and the first component from a vehicle back side,
   the retainer has an L shape including: an upward/downward extending portion extending in an up-down direction and having an upper end portion from which the airbag is deployed; and a sideward extending portion extending outward in the vehicle width direction from the upward/downward extending portion, the second component constitutes a front portion of the upward/downward extending portion and overlaps the head pipe from the vehicle back side, the first component is a box-shaped component with a back portion opened backward, is joined to a side portion of the second component, and constitutes a front portion of the sideward extending portion, the first component extends forward up to a position in front of the head pipe and on an outer side relative to the head pipe, the inflator is disposed at a position in front of the head pipe and on the outer side relative to the head pipe inside the first component, and the exterior member is fastened to the retainer with a cover fastening tool and the lid portion includes a ripping portion that is configured to be caused to rupture by the airbag deployed.

2. The airbag device for the saddled vehicle according to claim 1, wherein secured locations of the first component with respect to the second component and the third component are located around the inflator.

3. The airbag device for the saddled vehicle according to claim 1, wherein the second component is provided with a fastening portion that secures the retainer to a vehicle body.

4. The airbag device for the saddled vehicle according to claim 1, wherein the third component is provided with a guide portion that guides a flow of the gas inward in the vehicle width direction with a stepped shape inside the retainer.

5. The airbag device for the saddled device according to claim 1, wherein the first component includes an inflator support portion supporting the inflator, the first component and the second component are joined to form a front-side case, and the third component is joined to the front-side case.

6. The airbag device for the saddled vehicle according to claim 5, wherein the front-side case in an L shape and the third component in an L shape are joined to each other.

7. The airbag device for the saddled vehicle according to claim 5, wherein the first component and the second component are joined through welding, and the third component is detachably fastened to the front-side case.

8. The airbag device for the saddled vehicle according to claim 1, wherein the inflator is disposed in an orientation such that an axial line of the inflator is directed in a vehicle front-back direction, the first component supports the inflator with the inflator covered from a front side and is joined to the second component, and the third component is fitted to the first component and the second component from the vehicle back side.

* * * * *